(12) United States Patent
Hasegawa

(10) Patent No.: US 11,552,437 B2
(45) Date of Patent: Jan. 10, 2023

(54) ROTARY CONNECTOR DEVICE AND METHOD OF ASSEMBLING ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventor: Yuya Hasegawa, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 0 days.

(21) Appl. No.: 17/218,579

(22) Filed: Mar. 31, 2021

(65) Prior Publication Data

US 2021/0218210 A1 Jul. 15, 2021

Related U.S. Application Data

(63) Continuation of application No. PCT/JP2019/038592, filed on Sep. 30, 2019.

(30) Foreign Application Priority Data

Oct. 11, 2018 (JP) .............................. JP2018-192774

(51) Int. Cl.
*H01R 35/02* (2006.01)
*B60R 16/02* (2006.01)
*H01R 43/18* (2006.01)

(52) U.S. Cl.
CPC .......... *H01R 35/025* (2013.01); *B60R 16/02* (2013.01); *H01R 43/18* (2013.01); *H01R 2201/26* (2013.01)

(58) Field of Classification Search
CPC ... H01R 35/025; H01R 43/18; H01R 2201/26
(Continued)

(56) References Cited

U.S. PATENT DOCUMENTS 5,561,266 A 10/1996 Okamoto et al.
5,630,723 A 5/1997 Kawamoto
(Continued)

FOREIGN PATENT DOCUMENTS

CN 102084566 A 6/2011
CN 103262363 A 8/2013
(Continued)

OTHER PUBLICATIONS

International Search Report dated Nov. 19, 2019 in PCT/JP2019/038592 filed on Sep. 30, 2019, 5 pages (with English Translation).
(Continued)

*Primary Examiner* — Alexander Gilman
(74) *Attorney, Agent, or Firm* — Oblon, McClelland, Maier & Neustadt, L.L.P.

(57) ABSTRACT

A rotary connector device includes a rotation body and a fixed body that engage with each other in a relatively rotatable manner, in an interior thereof, a housing space having a cylindrical shape, and a flat cable housed in the housing space in a wound manner, wherein the rotation body includes: a rotating-side ring plate having an annular shape and an inner-circumferential cylindrical portion having a cylindrical shape; the fixed body includes: a stationary-side ring plate having an annular shape and an outer-circumferential cylindrical portion; the flat cable has a first end coupled to a stationary-side connector; the fixed body includes an insertion portion from the housing space toward an outer side of the fixed body along a rotation axis direction of the rotation body that relatively rotates; and the station-
(Continued)

ary-side connector is disposed on a main surface of the stationary-side ring plate on an outer side thereof.

8 Claims, 16 Drawing Sheets

(58) Field of Classification Search
USPC .......................................................... 439/499
See application file for complete search history.

(56) References Cited

U.S. PATENT DOCUMENTS

| | | | |
|---|---|---|---|
| 5,752,844 A | 5/1998 | Kawamoto | |
| 5,772,146 A | 6/1998 | Kawamoto et al. | |
| 2003/0073333 A1* | 4/2003 | Matsumoto | H01R 39/64 439/164 |
| 2003/0109158 A1* | 6/2003 | Oguma | H01R 35/025 439/164 |
| 2003/0129867 A1* | 7/2003 | Adachi | H01R 35/025 439/164 |
| 2007/0004236 A1* | 1/2007 | Suenaga | H01R 35/04 439/15 |
| 2008/0000712 A1* | 1/2008 | Tanaka | B62D 15/0215 73/117.02 |
| 2008/0003853 A1* | 1/2008 | Tanaka | B60R 16/027 439/164 |
| 2012/0237286 A1* | 9/2012 | Asakura | H01R 35/025 403/164 |
| 2018/0316149 A1* | 11/2018 | Yamashita | H01R 35/02 |
| 2019/0089109 A1* | 3/2019 | Hirai | H01R 35/025 |
| 2020/0001805 A1* | 1/2020 | Hiroki | H01R 35/04 |
| 2021/0001789 A1* | 1/2021 | Utsunomiya | B62D 15/021 |
| 2021/0218210 A1* | 7/2021 | Hasegawa | B60R 16/02 |

FOREIGN PATENT DOCUMENTS

| | | |
|---|---|---|
| CN | 103515820 A | 1/2014 |
| CN | 204304185 U | 4/2015 |
| CN | 105375222 A | 3/2016 |
| EP | 0 715 376 A2 | 6/1996 |
| EP | 2 302 753 A1 | 3/2011 |
| EP | 2 676 850 A1 | 12/2013 |
| EP | 2 693 577 A1 | 2/2014 |
| JP | 07-069219 A | 3/1995 |
| JP | 07-193955 A | 7/1995 |
| JP | 7-193958 A | 7/1995 |
| JP | 11-2781 79 A | 10/1999 |
| JP | 2015-220207 A | 12/2015 |
| JP | 2017-130438 A | 7/2017 |

OTHER PUBLICATIONS

Extended European Search Report dated Oct 15, 2021 in European Patent Application No. 19871637.5, 9 pages.
Combined Chinese Office Action and Search Report dated Mar. 2, 2022 in Patent Application No. 201980064387.8 (with English language translation), 22 pages.

* cited by examiner

ROTARY CONNECTOR DEVICE AND METHOD OF ASSEMBLING ROTARY CONNECTOR DEVICE

CROSS-REFERENCE TO RELATED APPLICATION

The present application is a continuation application of International Application No. PCT/JP2019/038592, filed Sep. 30, 2019, which claims priority to Japanese Patent No. 2018-192774 filed Oct. 11, 2018. The contents of these applications are incorporated herein by reference in their entirety.

TECHNICAL FIELD

The disclosure relates to a rotary connector device to be mounted on a vehicle such as an automobile.

BACKGROUND ART

In a vehicle such as an automobile, for example, electric device items provided at a steering wheel side and power sources or the like provided at a vehicle body side are electrically connected to each other through flat cables housed in a wound manner in the interior of a rotary connector device.

As one example of such a rotary connector device, Patent Document 1 discloses a rotary connector device having a substantially cylindrical shape. The device includes a rotation body including a rotating-side ring plate having an annular shape and an inner-circumferential cylindrical portion having a cylindrical shape and formed at an inner periphery edge of the rotating-side ring plate. The device also includes a fixed body including a stationary-side ring plate having an annular shape, and an outer-circumferential cylindrical portion having a cylindrical shape and formed at an outer periphery edge of the stationary-side ring plate. The rotation body and the fixed body are engaged with each other in a relatively rotatable manner. A rotating-side connector that communicates with a housing space is provided so as to stand upward on a main surface of the rotating-side ring plate that is opposite to the housing space. A stationary-side connector that communicates with the housing space is provided in an outer-circumferential cylindrical portion so as to protrude toward an outer side in a radial direction.

In this rotary connector device, a first end and a second end of the flat cable housed in the housing space comprised of the rotation body and the fixed body are coupled to the stationary-side connector and the rotating-side connector, respectively. This makes it possible to electrically connect, through the flat cable, the power source at the vehicle body side to the electric device item at the steering wheel side such as a horn module, an airbag module, or an audio control module.

In recent years, in response to demand for improved safety, the number of electric device items mounted on a vehicle increases, which leads to an increase in density of devices mounted on the vehicle. Meanwhile, there is demand for improved comfortableness of passengers, which leads to demand for reduced size of the rotary connector device.

CITATION LIST

Patent Documents

Patent Document 1: JP 2015-220207 A

SUMMARY

Technical Problem

In light of the problem described above, an object of the disclosure is to provide a rotary connector device and a method of assembling a rotary connector device, which make it possible to achieve miniaturization.

Solution to Problem

The disclosure provides a rotary connector device that includes: a rotation body and a fixed body that engage with each other in a relatively rotatable manner and form, in an interior thereof, a housing space having a cylindrical shape; and a flat cable housed in the housing space in a wound manner, in which the rotation body includes: a rotating-side ring plate having an annular shape and an inner-circumferential cylindrical portion having a cylindrical shape and forming an inner peripheral surface of the housing space, the fixed body includes: a stationary-side ring plate having an annular shape and an outer-circumferential cylindrical portion forming an outer peripheral surface of the housing space, the flat cable has a first end coupled to a stationary-side connector that is electrically connected to an electric device item disposed at a side of the fixed body, the fixed body includes an insertion portion that allows a first end side of the flat cable to be inserted from the housing space toward an outer side of the fixed body along a rotation axis direction of the rotation body that relatively rotates, and the stationary-side connector is disposed on a main surface of the stationary-side ring plate on an outer side thereof.

The rotation body includes a configuration including a rotator and a sleeve assembled to the rotator to form a single unit, in which the rotator includes a rotating-side ring plate having an annular shape and also includes an inner-circumferential cylindrical portion having a cylindrical shape and forming an inner peripheral surface of the housing space. A configuration only with the rotator is also included.

The fixed body includes a fixed body obtained by engaging a first fixed body constituting the stationary-side ring plate and a second fixed body constituting the outer-circumferential cylindrical portion with each other and also includes a fixed body obtained by forming the outer-circumferential cylindrical portion and the stationary-side ring plate into a single unit.

The electric device item includes anything that can be electrically connected such as a horn module, an airbag module, or the like provided on a steering wheel and mounted on the rotary connector device through the flat cable housed in the housing space. For example, the electric device item includes a battery for a vehicle body and an electric connection box provided at the vehicle body side.

The insertion portion may be provided in an outer periphery edge part or an inner periphery edge part of the stationary-side ring plate. The insertion portion may be provided so as to penetrate through a main surface of the stationary-side ring plate. In addition, the insertion portion may be formed in a portion of the outer-circumferential cylindrical portion. Furthermore, the outer-circumferential cylindrical portion and the stationary-side ring plate may form the insertion portion.

The stationary-side connector being disposed on a main surface of the stationary-side ring plate on an outer side thereof includes: a case where, when the housing space side is set as the inner side, the stationary-side connector is detachably disposed on the main surface of the stationary-side ring plate on the outer side thereof, that is, on the main surface that can be visually recognized from the outside; and a case where the stationary-side connector is disposed so as not to be able to be detached.

Specifically, it includes fixing the stationary-side connector to the stationary-side ring plate using other parts, which includes in turn, for example, a case where the stationary-side ring plate includes a latch portion or an engaging portion to latch or engage the stationary-side connector; a case where the stationary-side connector is disposed on the stationary-side ring plate by fixing the stationary-side connector using, for example, thermosetting resin or an adhesive; and a case where the stationary-side connector is screwed to the stationary-side ring plate, and it also includes a combination of these cases.

This invention makes it possible to achieve miniaturization of the rotary connector device.

Specifically, the fixed body includes the insertion portion. In addition, the stationary-side connector coupled to the first end of the flat cable is disposed on the stationary-side ring plate. This allows the first end side of the flat cable to exit from the housing space toward the outer side along the rotation axis direction, and this also allows the stationary-side connector coupled to the first end of the flat cable to be disposed so as to protrude toward a direction of the fixed body side.

In other words, it is possible to prevent the first end side of the flat cable from being pulled to the outer side in a radial direction, and it is also possible to prevent the stationary-side connector from protruding toward the outer side in the radial direction of the stationary-side ring plate. Thus, it is possible to reduce the size of the rotary connector device.

As one mode of the disclosure, a placement part used to place the stationary-side connector on the main surface of the stationary-side ring plate on the outer side thereof may be provided.

The placement part is a configuration used to detachably fix the stationary-side connector to the stationary-side ring plate and includes: a latch portion configured to latch and place the stationary-side connector to the stationary-side ring plate; and an engaging portion configured to engage the stationary-side connector with the stationary-side ring plate to place it. Note that the placement part provided at the stationary-side ring plate may be formed on the main surface of the stationary-side ring plate or may be formed so as to penetrate through the stationary-side ring plate.

This invention enables the stationary-side connector inserted into the insertion portion to be attached to or detached from the stationary-side ring plate, which makes it possible to efficiently perform the operation of assembling the rotary connector device.

More specifically, with the stationary-side ring plate including the placement part, it is possible to detach the stationary-side connector from the stationary-side ring plate. Thus, for example, when the stationary-side connector is coupled to the flat cable inserted into the insertion portion, it is possible to move the stationary-side connector to a desired position where the stationary-side connector can be easily coupled to the flat cable, which makes it possible to easily couple the flat cable to the stationary-side connector. This makes it possible to efficiently perform the operation of assembling the rotary connector device.

In addition, as one mode of the disclosure, the placement part may be formed integrally on the main surface, of the stationary-side ring plate on the outer side thereof.

The disclosure enables the flat cable to more smoothly slide in the housing space, which makes it possible to improve quality of the rotary connector device.

More specifically, the placement part used to place the stationary-side connector on the stationary-side ring plate is formed integrally on the main surface of the stationary-side ring plate on the outer side thereof, which makes it possible to prevent formation of a protrusion that protrudes toward the housing space; or a recessed portion recessed toward the outer side along the rotation axis direction; or a through-hole.

With this configuration, when the flat cable housed in the housing space is caused to slide in association with relative rotation of the rotation body, it is possible to prevent the flat cable from getting caught on the stationary-side ring plate, which makes it possible to cause the flat cable to smoothly slide. Thus, it is possible to improve quality of the rotary connector device.

In addition, it is possible to prevent the flat cable housed in the housing space from interfering with the main surface of the stationary-side ring plate on the housing space side, which makes it possible to prevent the flat cable from being damaged.

In addition, as one mode of the disclosure, the fixed body may include: a first fixed body including the outer-circumferential cylindrical portion; and a second fixed body including the stationary-side ring plate. In addition, the first fixed body may include a temporarily fixing portion configured to temporality fix the stationary-side connector at the outer side of the outer-circumferential cylindrical portion in the radial direction.

In addition, the disclosure may provide a method of assembling a rotary connector device. In the method, a rotation body and a fixed body are relatively rotatably engaged with each other and are assembled thus forming, in an interior thereof, a housing space having a cylindrical shape and housing, in a wound manner, a flat cable having a first end coupled to a stationary-side connector electrically connected to an electric device item disposed in a vehicle body. The rotation body includes: a rotating-side ring plate having an annular shape and an inner-circumferential cylindrical portion having a cylindrical shape and forming an inner peripheral surface of the housing space. The fixed body includes: a stationary-side ring plate having an annular shape; and an outer-circumferential cylindrical portion forming an outer peripheral surface of the housing space. The fixed body includes: a first fixed body including the outer-circumferential cylindrical portion; and a second fixed body including the stationary-side ring plate provided with: an insertion portion that allows a first end side of the flat cable to be inserted from the housing space toward an outer side of the fixed body along a rotation axis direction of the rotation body that relatively rotates; and a placement part used to place the stationary-side connector on a main surface of the stationary-side ring plate on an outer side thereof. The method may include: a first-fixed-body assembling step in which the first fixed body of the outer-circumferential cylindrical portion is assembled to the rotation body around which the flat cable is wound; a stationary-side-connector temporarily fixing step in which the stationary-side connector is temporarily fixed; a second-fixed-body assembling step in which the second fixed body is assembled to the first fixed body in a manner such that the first end side of the flat cable is inserted into the insertion portion from the housing space toward the outer side along the rotation axis direction; and a stationary-side-connector placing step in which the stationary-side connector that has been temporarily fixed is placed at the placement part. These steps are performed in this order.

In addition, in the method of assembling a rotary connector device described above, the first fixed body may include a temporarily fixing portion provided at an outer side of the outer-circumferential cylindrical portion in a radial direction and configured to temporarily fix the stationary-side connector coupled to the first end of the flat cable, and in the stationary-side-connector temporarily fixing step, the stationary-side connector may be temporarily fixed to the temporarily fixing portion.

The stationary-side-connector temporarily fixing step does not specify a location where the stationary-side connector is temporarily fixed. For example, the stationary-side-connector temporarily fixing step includes: a case where the stationary-side connector is temporarily fixed at a temporarily fixing portion provided in the outer-circumferential cylindrical portion included in the first fixed body; and a case where the stationary-side connector is temporarily fixed at a temporarily fixing portion separately provided in an assembling apparatus for assembling the rotary connector device.

The disclosure makes it possible to prevent the flat cable from being damaged at the time of assembling the rotary connector device and also possible to efficiently operate the assembling work.

More specifically, the fixed body is comprised of the first fixed body and the second fixed body. Thus, it is possible to assemble the rotary connector device such that the first fixed body is assembled to the rotation body in which the flat cable is wound around the inner-circumferential cylindrical portion; then, the stationary-side connector is caused to exit to the outer side of the housing space; and the flat cable coupled to the stationary-side connector through the insertion portion is caused to be inserted into the insertion portion from the housing space toward the outer side along the rotation axis direction. After this, it is possible to assemble the second fixed body to the first fixed body.

This makes it possible to prevent the flat cable inserted into the insertion portion from interfering with the second fixed body, which makes it possible to prevent the flat cable from being damaged.

In addition, in a case where this second fixed body is assembled to the first fixed body, it is possible to temporarily fix the stationary-side connector that has been coupled to the first end of the flat cable. Thus, the stationary-side connector and the first end side of the flat cable do not block the operation of assembling the fixed body, which makes it possible to efficiently perform the assembling operation.

Furthermore, by temporarily fixing the stationary-side connector, it is possible to more reliably prevent the first end side of the flat cable from being damaged due to the first end side being twisted or interfering with other members during the operation of assembling the second fixed body.

As described above, with the fixed body including the first fixed body and the second fixed body and the first fixed body includes a temporarily fixing portion, it is possible to prevent the flat cable from being damaged, and also possible to efficiently perform the operation of assembling the rotary connector device.

In addition, as one mode of the disclosure, all or a portion of the insertion portion may be provided at an outer side than the housing space in a radial direction.

This invention allows the flat cable coupled to the stationary-side connector to be inserted through the insertion portion provided at the outer side of the stationary-side ring plate in the radial direction, which makes the insertion portion disposed at the outer side, in the radial direction, than the flat cable housed in the housing space. Thus, it is possible to prevent the first end side of the flat cable to be inserted from the insertion portion from being rubbed against the flat cable that has been wound at the inner side in the radial direction, which makes it possible to prevent the flat cable from being damaged.

In addition, as one mode of the disclosure, a stationary-side cover to be attached to the stationary-side ring plate may be provided so as to surround a portion where the stationary-side connector and the flat cable are coupled.

This invention makes it possible to protect the first end side of the flat cable and the stationary-side connector, and also possible to prevent an accidental external force from acting on the first end side of the flat cable and the stationary-side connector. Thus, it is possible to prevent the stationary-side connector and the first end side of the flat cable from being damaged.

Furthermore, as one mode of the disclosure, the stationary-side connector may be disposed at an inner side in a radial direction than an outer periphery edge of the stationary-side ring plate.

The disclosure allows the stationary-side connector to be reliably disposed at an inner side in the radial direction when the rotary connector device is viewed from the bottom surface, which makes it possible to pull the first end side of the flat cable toward the inner side in the radial direction. Thus, it is possible to prevent the flat cable from interfering with other members disposed at an outer side of the rotary connector device in the radial direction, which makes it possible to prevent the flat cable from being damaged and also possible to reliably reduce the size of the rotary connector device.

Advantageous Effects of Invention

According to the disclosure, it is possible to provide a rotary connector device and a method of assembling a rotary connector device, which make it possible to achieve miniaturization.

DESCRIPTION OF EMBODIMENTS

In the following, one embodiment of the disclosure will be described together with the drawings.

Figure 1:
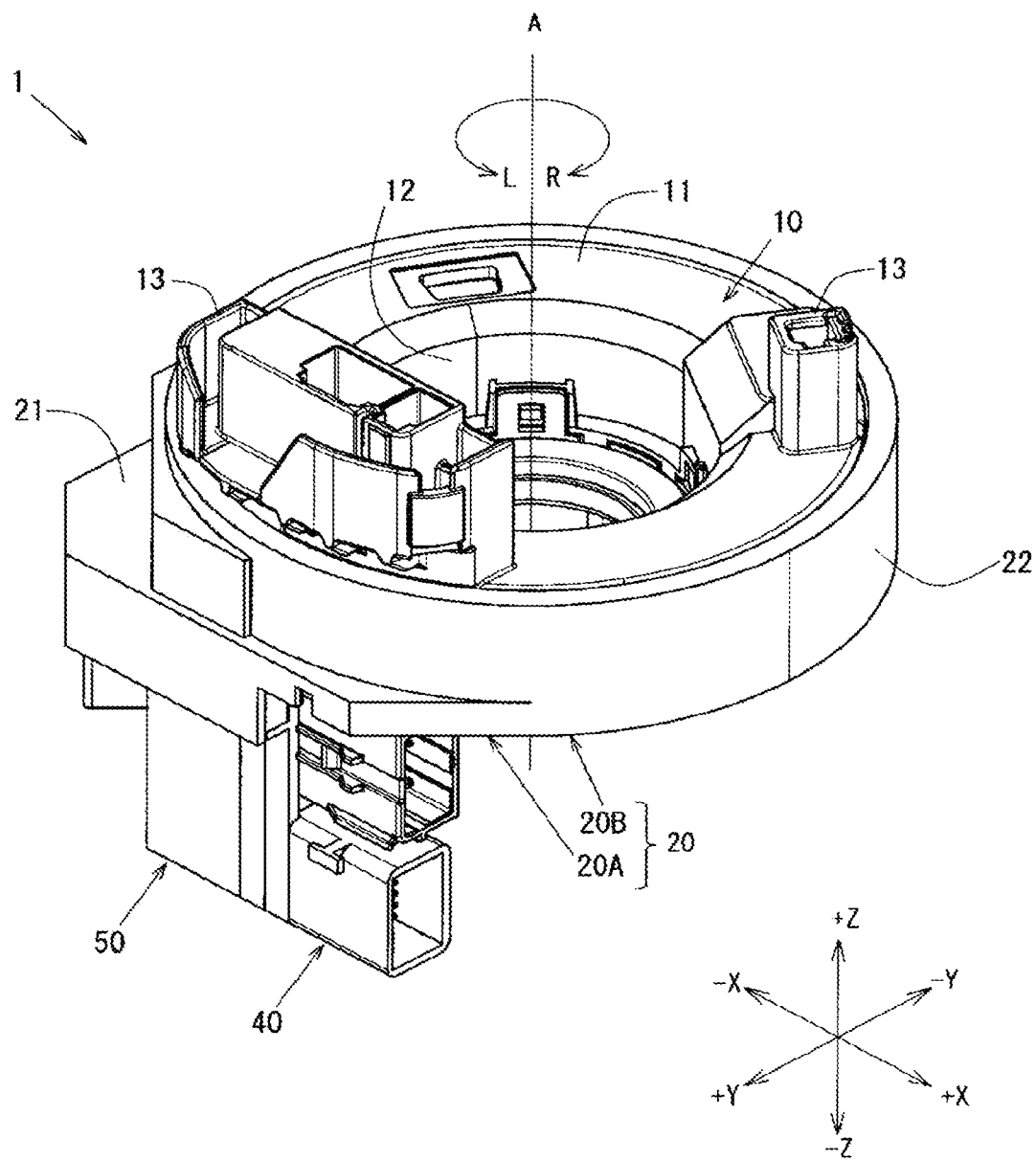
FIG. 1 is a schematic perspective view when a rotary connector device is viewed from above.
Figure 2:
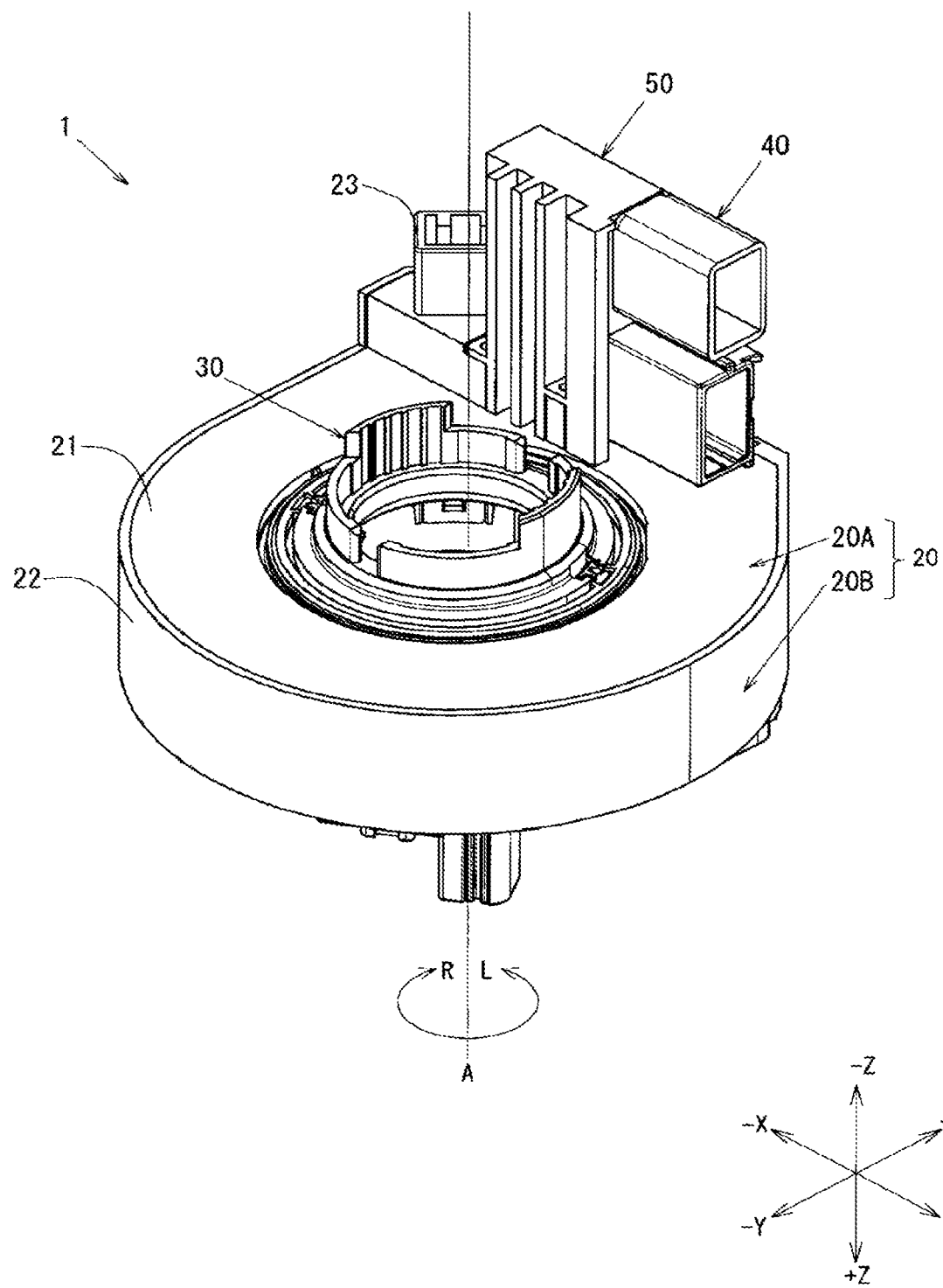
FIG. 2 is a schematic perspective view when the rotary connector device is viewed from below.
Figure 3:
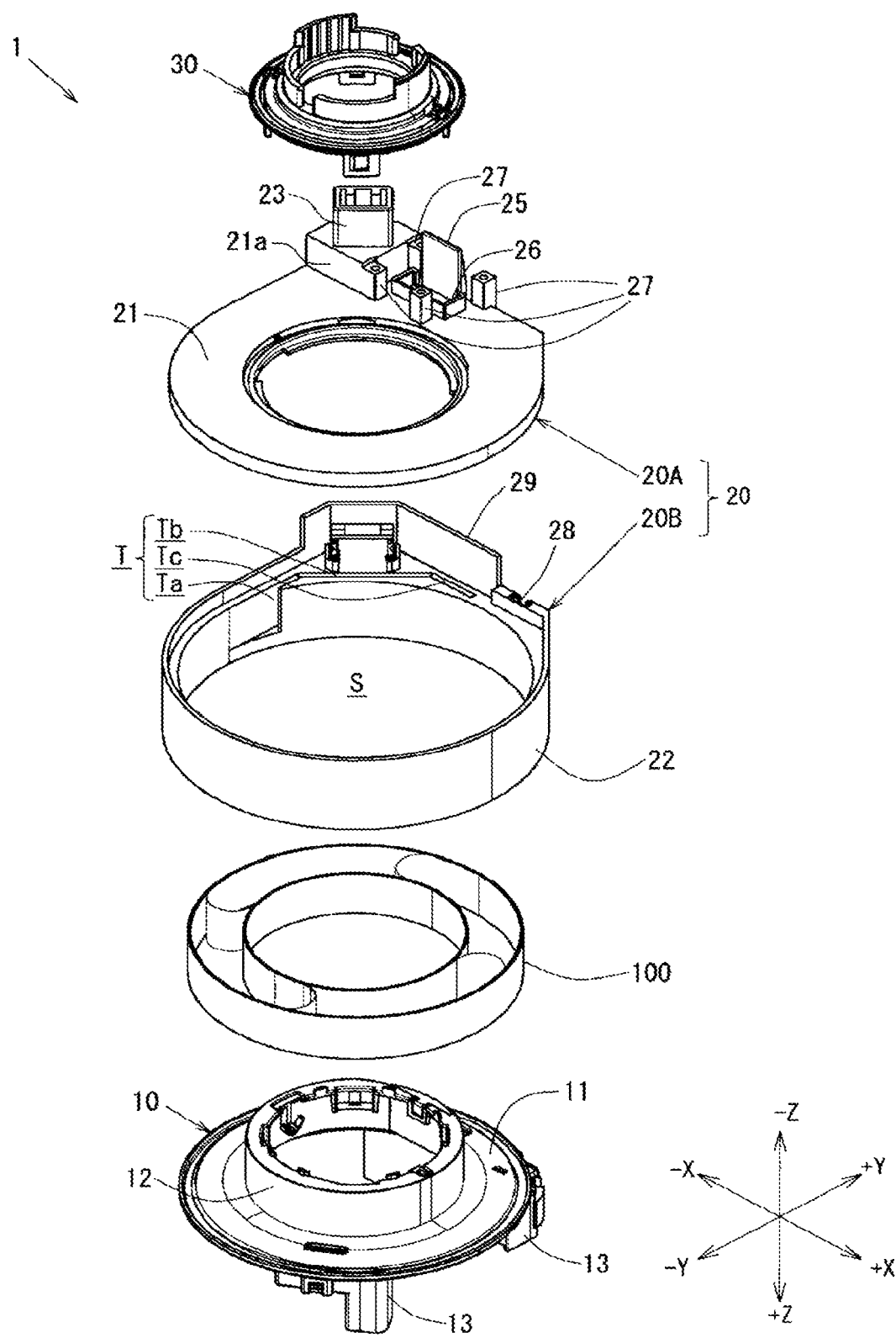
FIG. 3 is a schematic exploded perspective view when the rotary connector device is viewed from below.

FIG. 1 is a schematic perspective view when a rotary connector device 1 is viewed from above. FIG. 2 is a schematic perspective view when the rotary connector device 1 is viewed from below. FIG. 3 is a schematic exploded perspective view when the rotary connector device 1 is viewed from below. Note that, in FIG. 3, a stationary-side connector 40 and a housing cover 50 are not illustrated.

In the present embodiment, with a stator 20 being the reference, a rotator 10 side is set as a +Z direction (upward), a sleeve 30 side is set as a −Z direction (downward), and the upward and downward direction is set as a ±Z direction. In addition, in FIG. 1, the right front side is set as a +X direction, the left back side is set as a −X direction, and the front and rear direction is set as a ±X direction. Similarly, the left front side is set as a +Y direction, the right back side is set as a right-side −Y direction, and a direction from the right side toward the left side is set as a ±Y direction. The ±Z direction, the ±X direction, and the ±Y direction are perpendicular to each other. In addition, these settings are identical in FIGS. 2 to 15.

Figure 4:
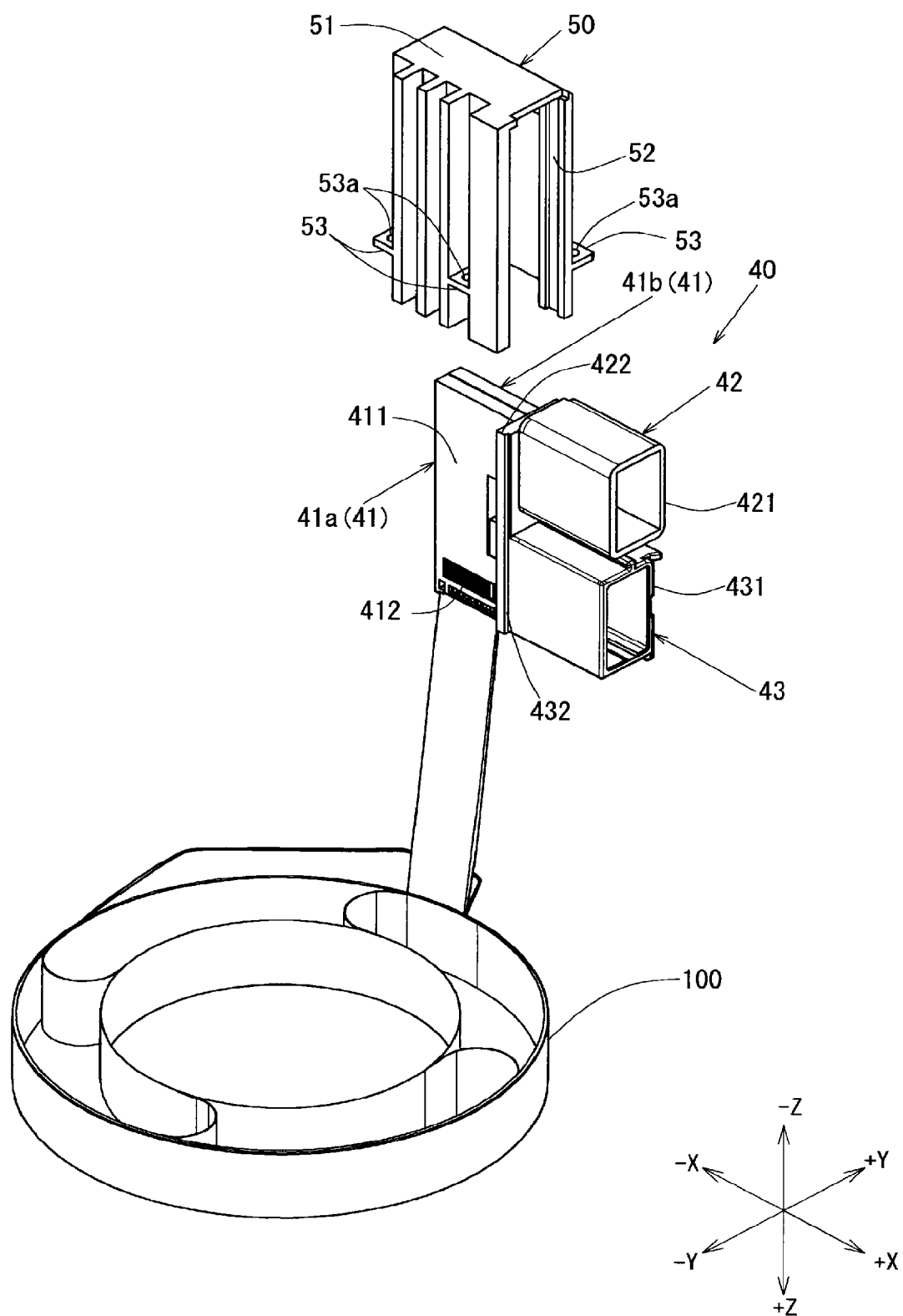
FIG. 4 is a schematic exploded perspective view illustrating a flat cable, a stationary-side connector, and a housing cover.
Figure 6A:
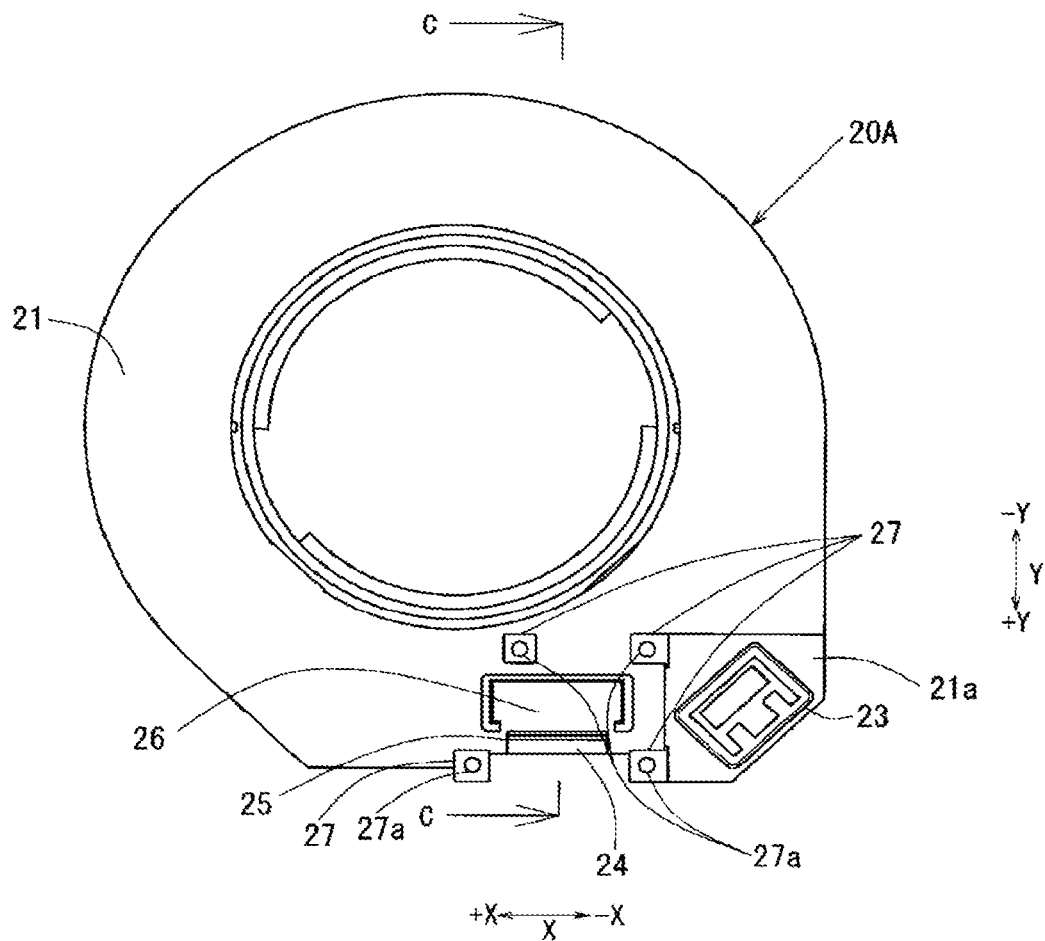
FIGS. 6A and 6B are explanatory diagrams each illustrating a stator main body.
Figure 6B:
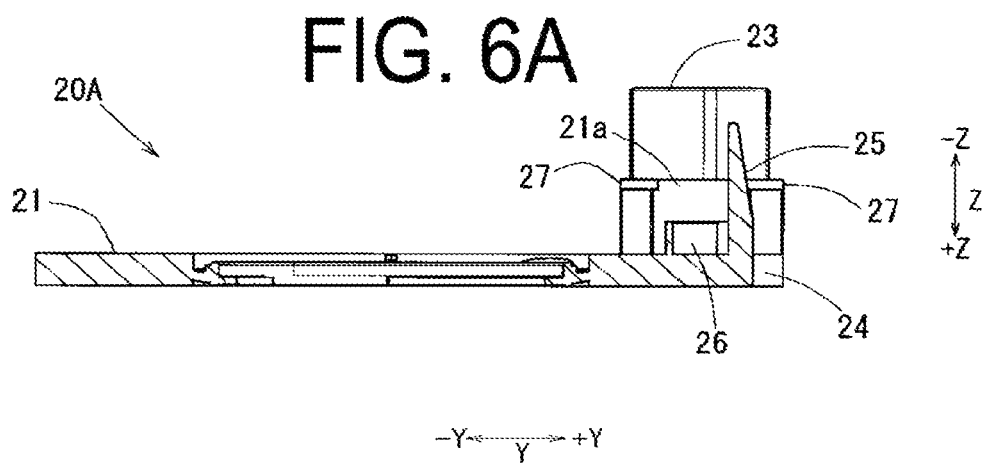
Figure 7A:
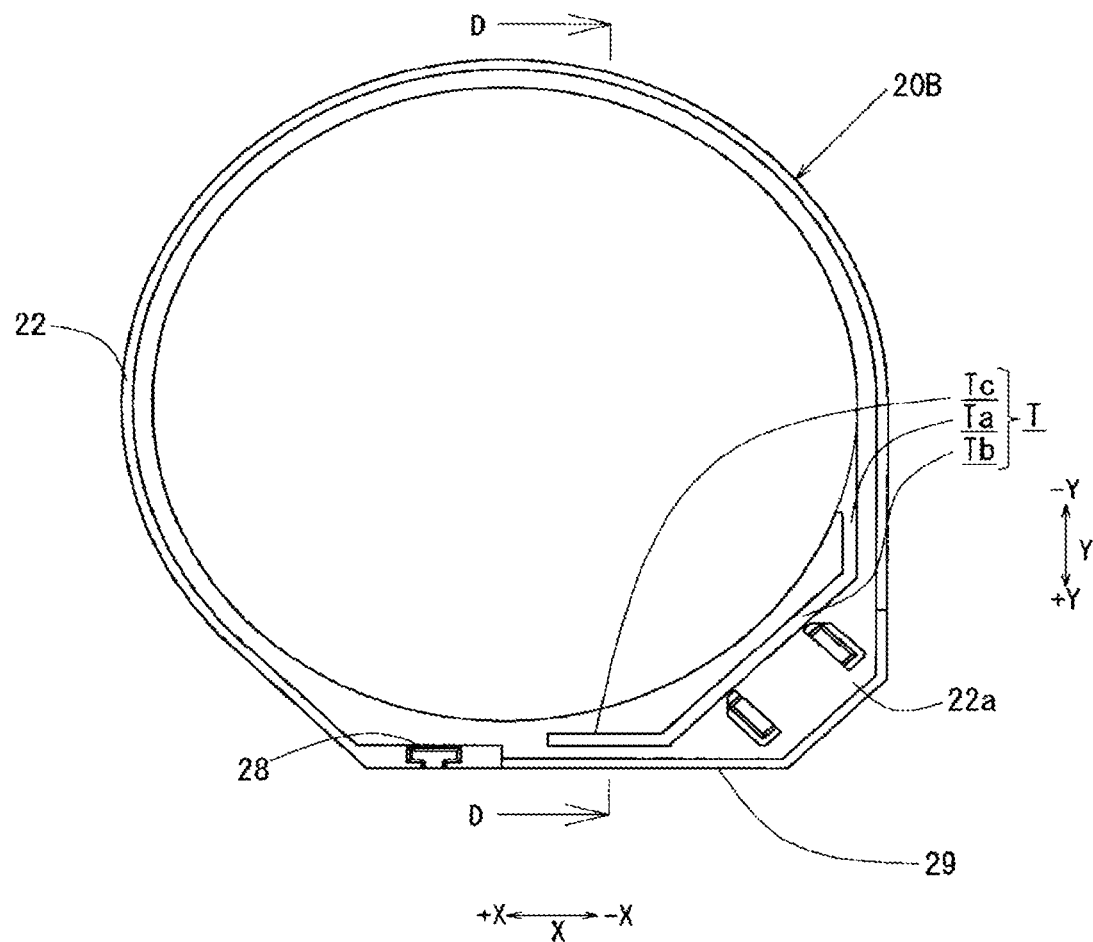
FIGS. 7A and 7B are explanatory diagrams each illustrating a sub-stator.
Figure 7B:
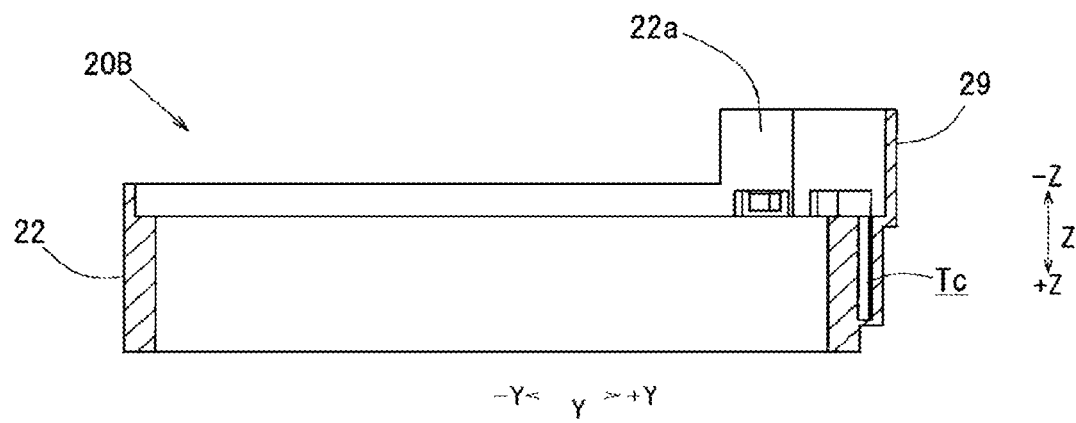
Figure 8A:
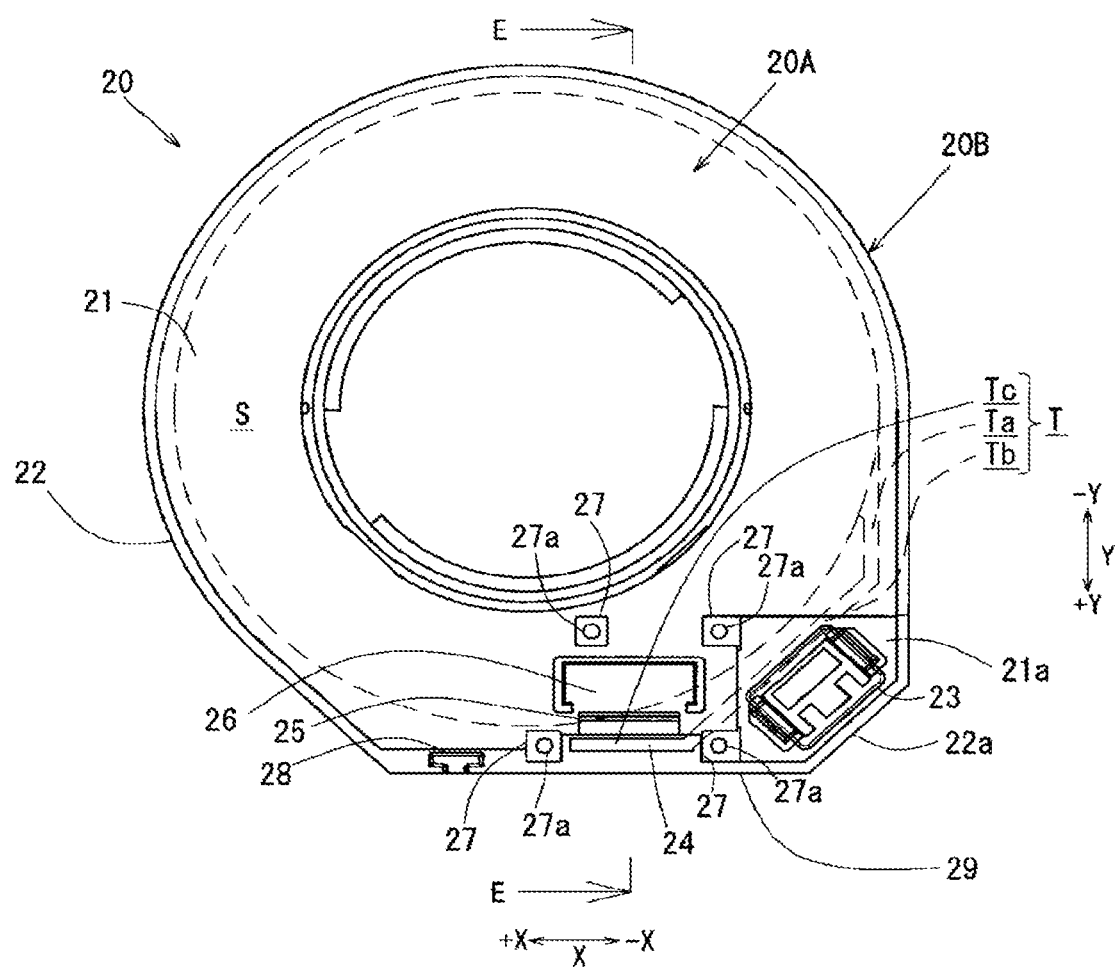
FIGS. 8A and 8B are explanatory diagrams each illustrating a stator.
Figure 8B:
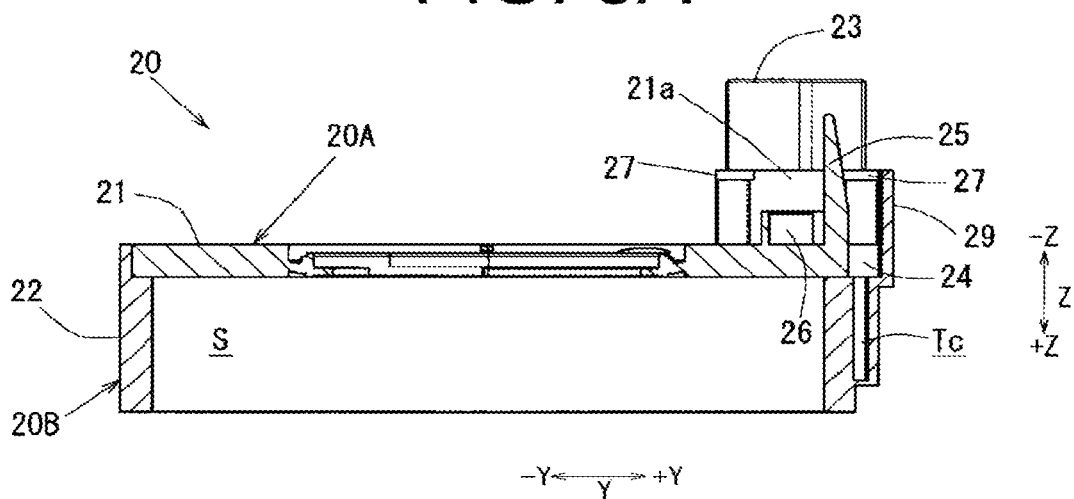

FIG. 4 is a schematic exploded perspective view illustrating a flat cable 100 to be housed in a housing space S, the stationary-side connector 40 coupled to a first end of the flat cable 100, and the housing cover 50. FIGS. 5A to 5E are explanatory diagrams illustrating the stationary-side connector 40 and the housing cover 50. FIGS. 6A and 6B are explanatory diagrams each illustrating a stator main body 20A. FIGS. 7A and 7B are explanatory diagrams each illustrating a sub-stator 20B. FIGS. 8A and 8B are explanatory diagrams each illustrating the stator 20 in which the stator main body 20A and the sub-stator 20B are assembled together.

FIGS. 5 to 9 will be described in detail. FIG. 5A is a side view of the stationary-side connector 40. FIG. 5B is a bottom view of the stationary-side connector 40. FIG. 5C is a cross-sectional view as viewed toward A-A in FIG. 5A. FIG. 5D is a side view of the housing cover 50. FIG. 5E is a cross-sectional view taken along B-B in FIG. 5D.

FIG. 6A is a bottom view of the stator main body 20A and FIG. 6B is a cross-sectional view as viewed toward C-C in FIG. 6A. FIG. 7A is a bottom view of the sub-stator 20B and FIG. 7B is a cross-sectional view as viewed toward D-D in FIG. 7A. FIG. 8A is a bottom view of the stator 20 and FIG. 8B is a cross-sectional view as viewed toward E-E in FIG. 8A.

Note that the cross-sectional view as viewed toward C-C, the cross-sectional view as viewed toward D-D, and the cross-sectional view as viewed toward E-E are cross-sectional views each taken along a cutting plane located at each of the corresponding positions.

Figure 9:
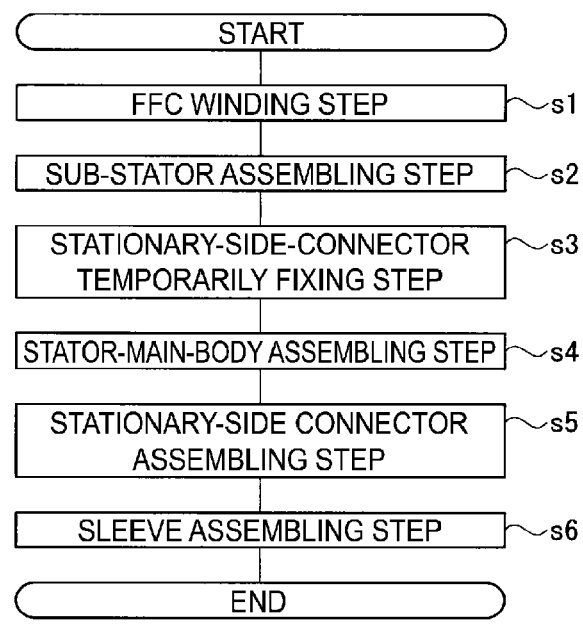
FIG. 9 is a flow chart showing a method of assembling a rotary connector device.
Figure 10:
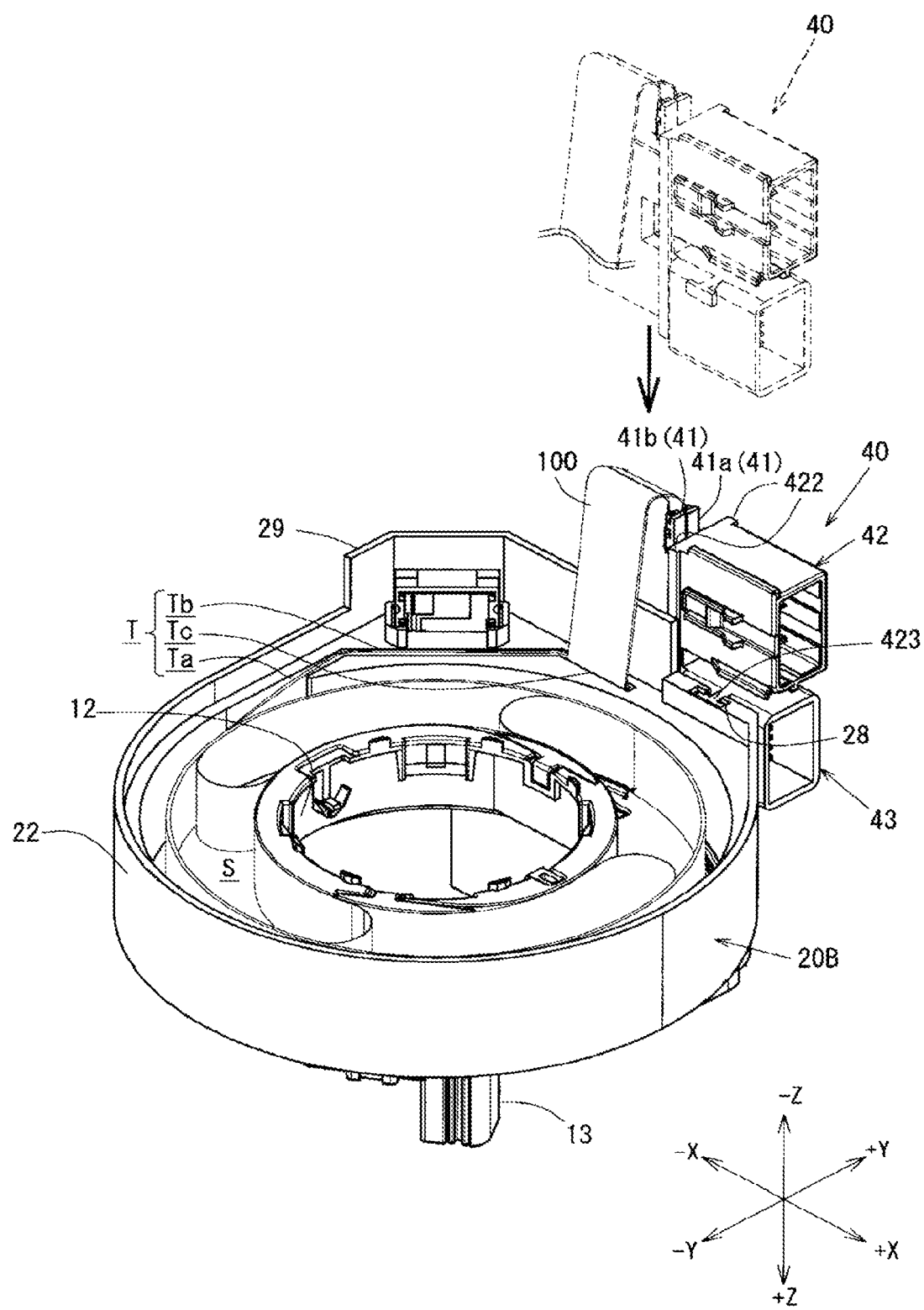
FIG. 10 is a schematic perspective view illustrating a state where a stationary-side connector is assembled to a rotator and sub-stator that have been assembled together.
Figure 11:
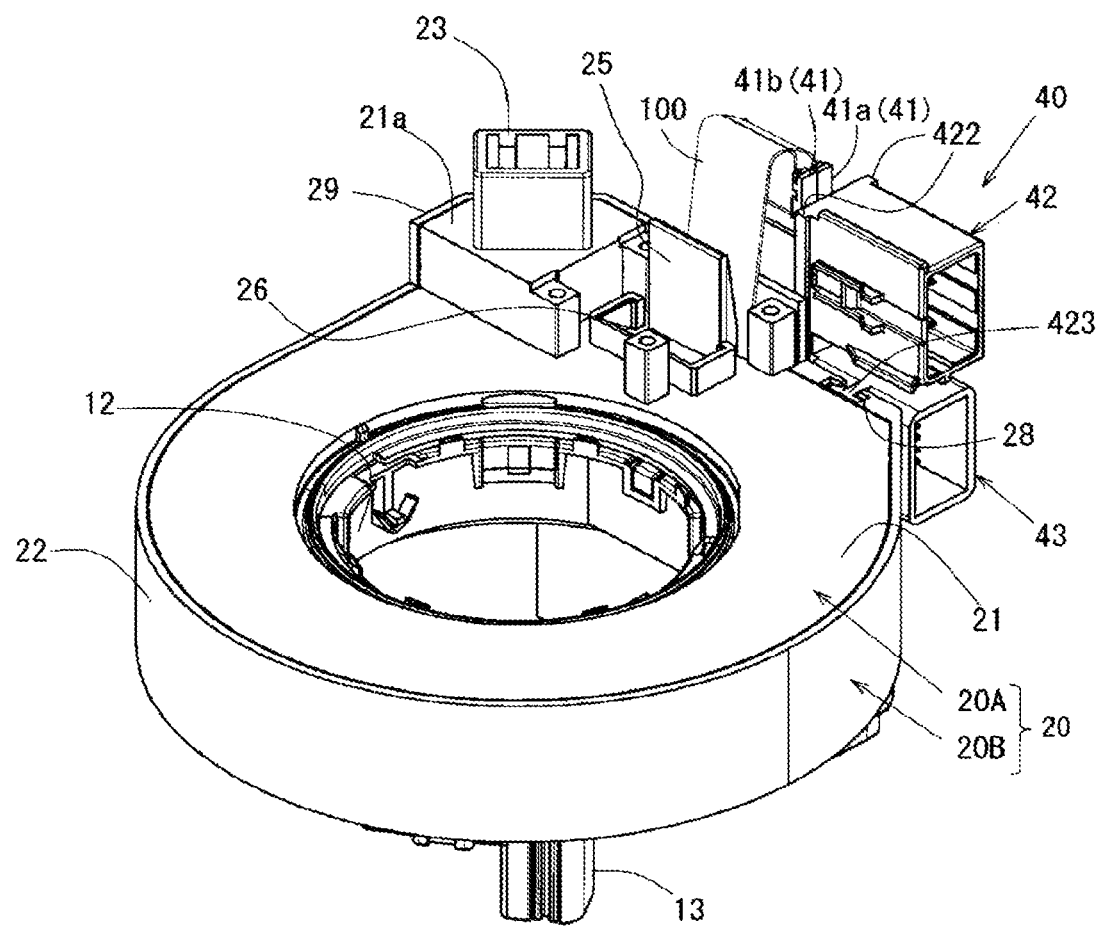
FIG. 11 is a schematic perspective view illustrating a state where a stator main body is assembled to a sub-stator to which a stationary-side connector is temporarily fixed.
Figure 11:
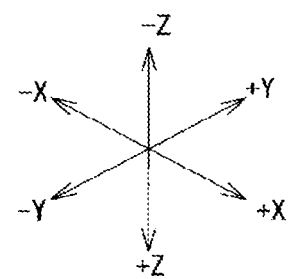

FIG. 9 is a flowchart showing an assembling method used to assemble the rotary connector device 1. FIG. 10 is a schematic perspective view illustrating a state where the stationary-side connector 40 is temporarily fixed to the rotator 10 and the sub-stator 20B that have been assembled together. FIG. 11 is a schematic perspective view illustrating a state where the stator main body 20A is assembled to the sub-stator 20B to which the stationary-side connector 40 is temporarily fixed.

Figure 12:
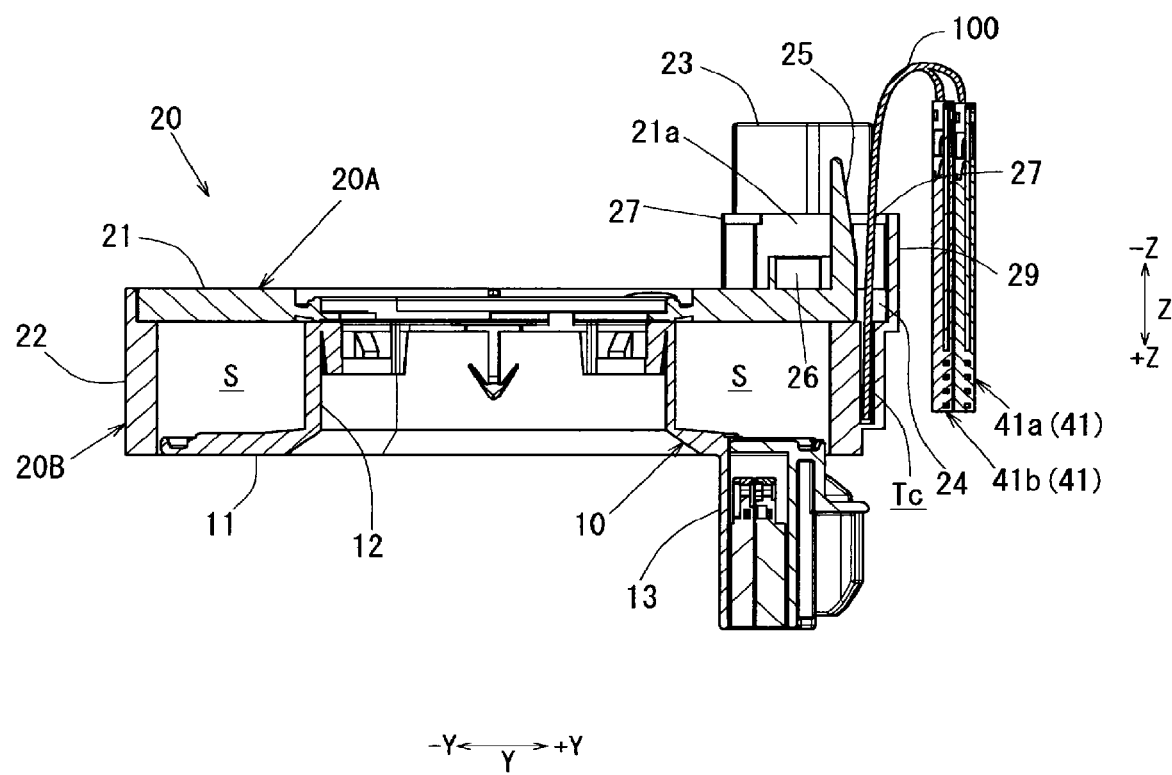
FIG. 12 is a cross-sectional view of a state where the stator main body is assembled to the rotator and the sub-stator that have been assembled together.
Figure 13:
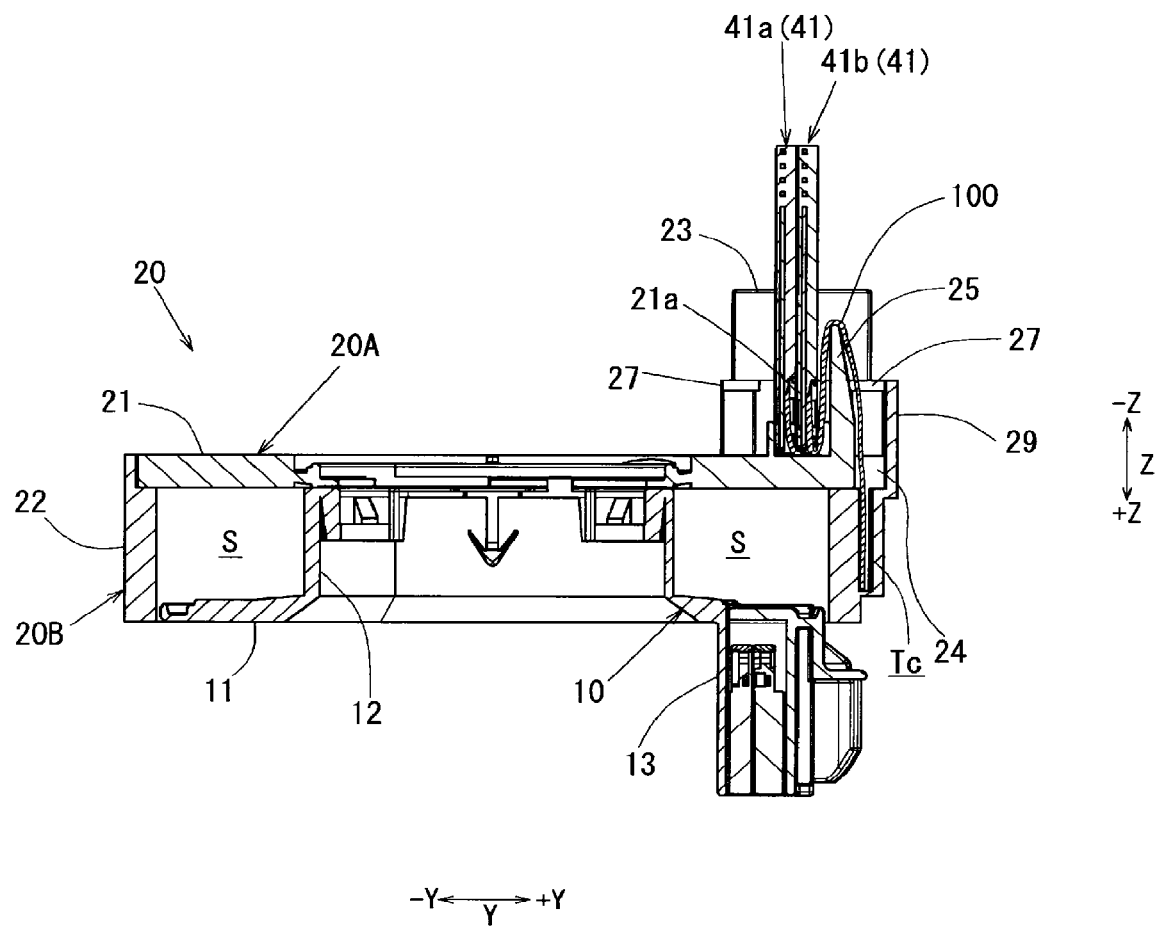
FIG. 13 is a cross-sectional view of a state where the stationary-side connector is assembled to the rotator and the stator that have been assembled together.

FIG. 12 is a cross-sectional view of a state where the stator main body 20A is assembled to the rotator 10 and the sub-stator 20B that have been assembled together. FIG. 13 is a cross-sectional view of a state where the stationary-side connector 40 is assembled to the rotator 10 and the stator 20 that have been assembled together.

Note that FIGS. 12 and 13 are cross-sectional views at positions each corresponding to a cutting plane at the cross-sectional view as viewed toward C-C.

Figure 14:
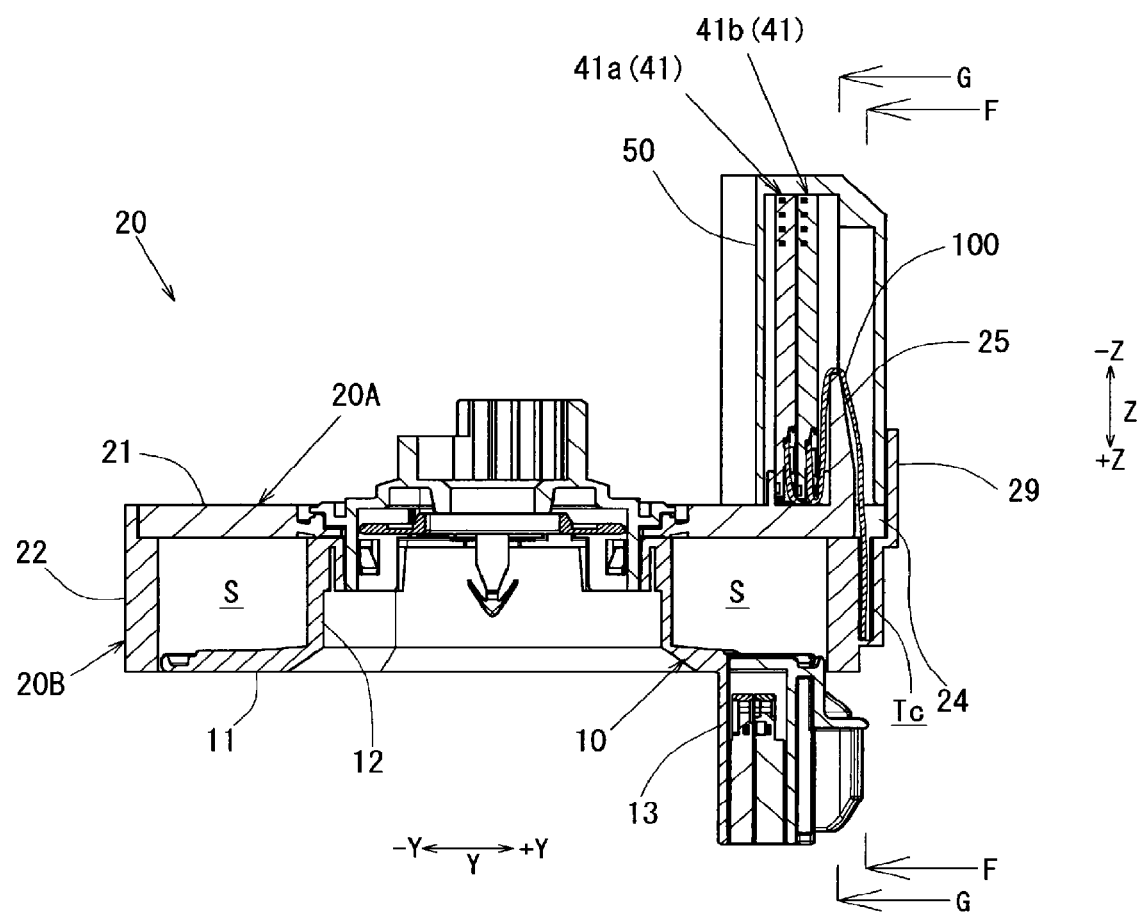
FIG. 14 is a cross-sectional view of a state where a housing cover is assembled to the assembled stationary-side connector.
Figure 15A:
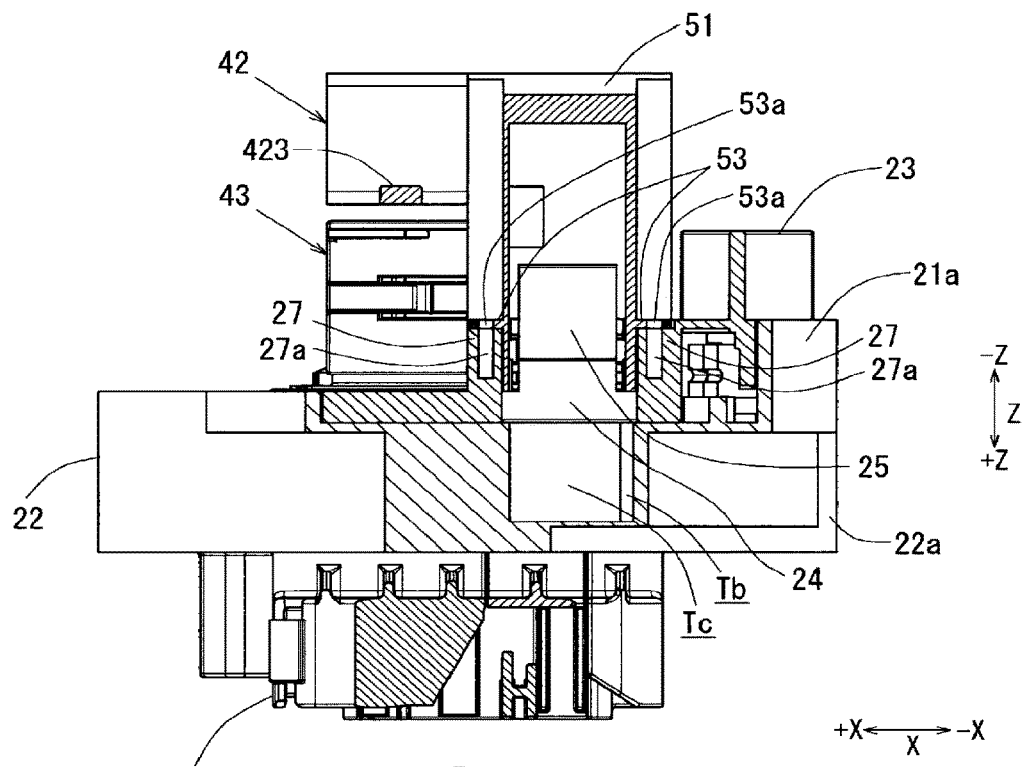
FIGS. 15A and 15B are cross-sectional views of a state where the housing cover is assembled to the assembled stationary-side connector.
Figure 15B:
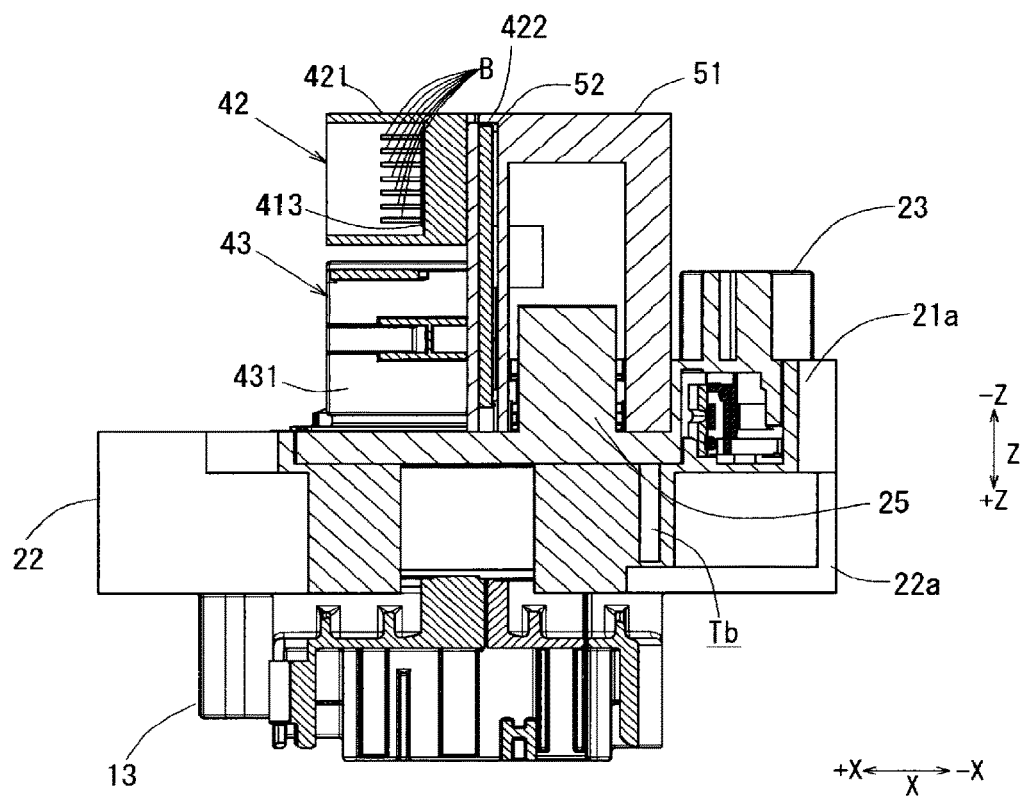

FIG. 14 is a cross-sectional view of a state where the housing cover 50 is assembled to the stationary-side connector 40 together with the rotator 10 and the stator 20 that have been assembled together. FIGS. 15A and 15B are a cross-sectional view as viewed toward F-F and a cross-sectional view as viewed toward G-G in FIG. 14.

Note that FIG. 14 is a cross-sectional view at a position corresponding to a cutting plane at the cross-sectional view as viewed toward C-C.

As illustrated in FIGS. 1 to 3, the rotary connector device 1 is a substantially cylindrical body obtained by assembling the rotator 10, the stator 20 located below the rotator 10, and the sleeve 30 assembled so as to enable the rotator 10 and stator 20 to relatively rotate, this assembling being performed in this order from the upper side along the ±Z direction. The housing space S having a cylindrical shape and formed from the rotator 10 and the stator 20 houses two layers of the flat cables 100 (hereinafter, each referred to as an FFC 100) that are layered to each other in a wound manner.

First, description will be made of: the FFC 100 housed in the housing space S, the stationary-side connector 40 coupled to the FFC 100, and the housing cover 50 assembled to the stationary-side connector 40.

The FFC 100 includes a plurality of strip-shaped conductors (not illustrated) arranged in parallel, and an insulating covering (not illustrated) disposed between strip-shaped conductors to insulate them. A conductor exposure section (not illustrated) obtained by stripping a portion of the insulating covering is formed at both end portions of the FFC 100, exposing a predetermined length of the strip-shaped conductor. A first end side of the conductor exposure section exposed in such a manner is coupled to the stationary-side connector 40, and a second end side thereof is coupled to a rotating-side connector, which is not illustrated.

As illustrated in FIGS. 4 and 5, the stationary-side connector 40 coupled to the first end of the FFC 100 includes: a busbar maintaining portion 41 (a busbar maintaining portion 41a and a busbar maintaining portion 41b) configured to maintain busbars B coupled to the strip-shaped conductor of each of two layers of the FFCs 100 that have been wound around; an upper busbar cover 42 that protects the busbars B disposed at the upper side; and a lower busbar cover 43 that protects the busbars B disposed at the lower side.

Figure 5A:
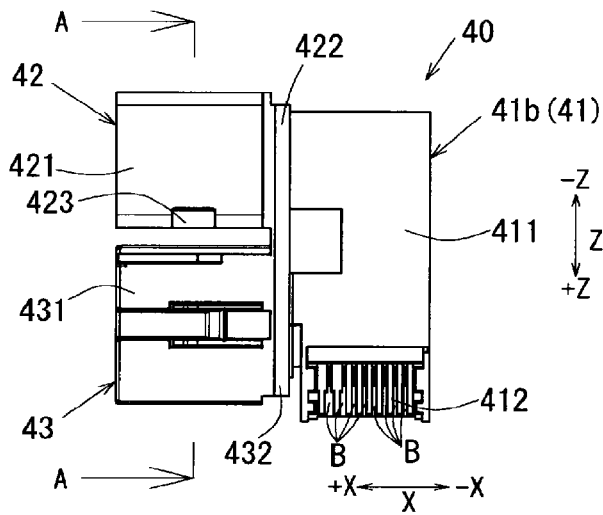
FIGS. 5A to 5E are explanatory diagrams illustrating the stationary-side connector and the housing cover.

As illustrated in FIG. 5A, the busbar maintaining portion 41 includes: a busbar maintaining body 411 being a plate-shaped body having a rectangular shape and configured to maintain eight busbars B coupled to the FFC 100; a conductor connection section 412 configured to expose the busbars B to be coupled to the conductor exposure section of the FFC 100; and a protruding-portion maintaining portion 413 configured to maintain nine busbars B (including one dummy busbar) each protruding in the +X direction. Note that the busbars B maintained by the busbar maintaining portion 41 are each formed into a substantially L-shape as viewed from the side.

The conductor connection section 412 is an opening portion formed by opening a side surface, in the +Y direction, of the busbar maintaining body 411 at the bottom surface side (side of the −Z direction) and is configured to expose the base end side of the busbar B. In other words, an end portion of the busbar maintaining body 411 in the −Z direction, that is, a bottom surface of the busbar maintaining body 411 at a side where the conductor connection section 412 is formed is formed into a substantially rectangular shape.

The protruding-portion maintaining portion 413 of the busbar maintaining portion 41a is set such that, in the upper side, seven busbars B are arranged along the ±Z direction so as to protrude in the +X direction, and in the lower side, two busbars B are arranged along the ±Z direction so as to protrude in the +X direction.

On the other hand, the protruding-portion maintaining portion 413 of the busbar maintaining portion 41b is set such that, in the upper side, seven busbars B are arranged along the ±Z direction so as to protrude in the +X direction, and in the lower side, two busbars B are arranged along the ±Z direction so as to protrude in the +X direction from a position that is shifted toward the +Y direction from the busbars B in the upper side.

Figure 5D:
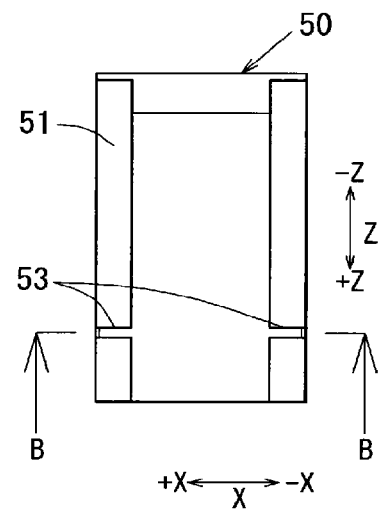
Figure 5B:
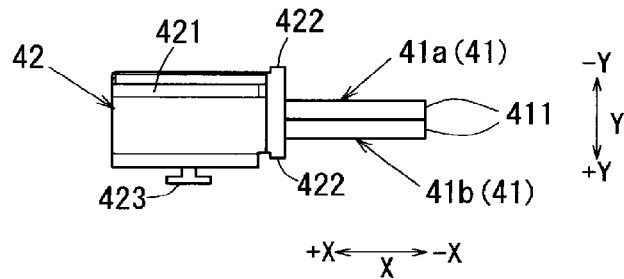
Figure 5E:
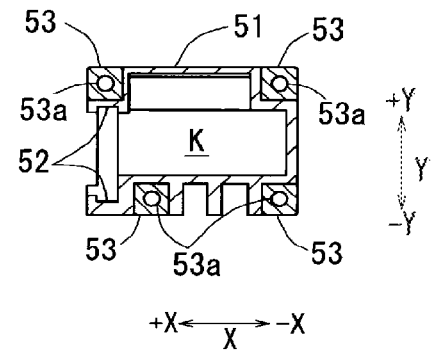
Figure 5C:
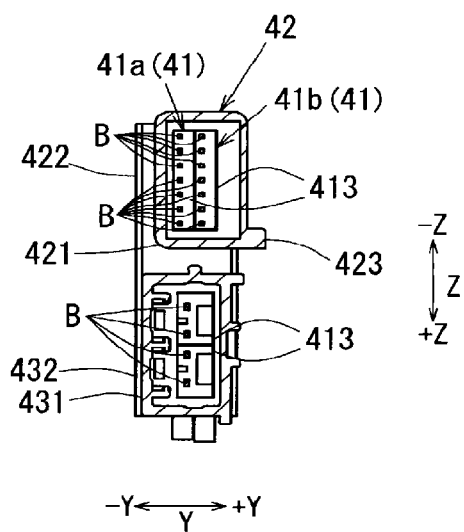

In other words, as illustrated in FIG. 5C, two layers of the busbar maintaining portion 41a and the busbar maintaining portion 41b are layered with each other in the ±Y direction. With these two busbar maintaining portions 41, two lines each having seven busbars B maintained along the ±Z direction are arranged so as to be adjacent to each other in the ±Y direction. On the other hand, four busbars B disposed at the lower side are arranged so as to be adjacent to each other in the ±Z direction.

Note that, with the two busbar maintaining portions 41a and 41b being layered with each other, the bottom surface portion where the conductor connection section 412 is formed has a rectangular shape having double the plate thickness of the busbar maintaining portion 41.

The upper busbar cover 42 that protects 14 busbars B disposed in the upper side includes: an upper cover main body 421 having a rectangular shape in a cross-section and formed into a hollow shape; and an upper engaging convex portion 422 disposed at a base end side (side of the −X direction) of the upper cover main body 421 and protruding toward the ±Y direction. In addition, a temporary latch portion 423 that protrudes in the +Y direction is provided at the center of a lower end portion on a side surface of the upper cover main body 421 in the −Y direction.

The upper engaging convex portion 422 that protrudes toward the ±Y direction from the base end side (side of the −X direction) of each of both side surfaces of the upper cover main body 421 is formed along the ±Z direction.

As illustrated in FIGS. 5B and 5C, the temporary latch portion 423 is formed as a plate-shaped body having a rectangular shape in which the base end side thereof has a predetermined plate thickness and protrudes in the +Y direction from a side surface of the upper cover main body 421 in the −Y direction, and the tip thereof in the +Y direction has a predetermined thickness with respect to the ±Z direction and also has a predetermined length along the ±X direction.

That is, the temporary latch portion 423 is formed into a substantially T-shape as viewed from the bottom surface (see FIG. 5B).

As illustrated in FIG. 5C, the lower busbar cover 43 disposed below the upper busbar cover 42 is a cover used to protect four busbars B disposed in the lower side and includes: a lower cover main body 431 having a rectangular shape in a cross-section and formed into a hollow shape; and a lower engaging convex portion 432 provided at a base end side (side of the −X direction) of the lower cover main body 431 and formed along the ±Z direction. Note that the lower engaging convex portion 432 is formed at a position that aligns with the upper engaging convex portion 422 on a straight line.

The stationary-side connector 40 configured in this manner is connected to a connector of an electric wire cable (not illustrated) connected to a battery or electric connection box provided in a vehicle body.

As illustrated in FIGS. 4, 5D, and 5E, the housing cover 50 that protects the busbar maintaining portion 41 is integrally comprised of: a housing cover main body 51 that is a hollow-shaped housing and has openings in the +Z direction and the +X direction; an engage groove 52, 52 formed in the opening of the housing cover main body 51 in the +X direction; and a cover fixing portion 53 formed on the outer frame of the housing cover main body 51.

As illustrated in FIGS. 4 and 5D, the housing cover main body 51 is a housing formed such that the lengths of the inner wall thereof in the ±Z direction and the ±Y direction are substantially equal to the corresponding lengths of the stationary-side connector 40, and the inner part of the housing cover main body 51 includes a protection space K that can house the busbar maintaining body 411.

As illustrated in FIG. 5E, the engage groove 52, 52 is formed as a recessed portion formed from the inner wall of each of both side surfaces at the opening of the housing cover main body 51 in the +X direction, and the recessed portion is recessed toward a direction opposite to the direction toward the protection space K. This recessed portion extends along the ±Z direction.

In addition, the spacing between these engage grooves 52 is formed so as to be equal to the length of the spacing between the upper engaging convex portions 422 and 422. That is, by engaging the upper engaging convex portion 422, 422 with the engage groove 52, 52, it is possible to attach the housing cover 50 to the stationary-side connector 40.

The cover fixing portion 53 is a plate-shape body in which a through-hole 53a having a circular shape is formed at the center portion thereof. As illustrated in FIGS. 4 and 5E, the cover fixing portion 53 is formed at each corner portion of the housing cover main body 51 as viewed from the bottom surface and is formed at a predetermined height from the bottom surface of the housing cover main body 51.

As illustrated in FIGS. 1 and 3, the rotator 10 that constitutes the rotary connector device 1 is integrally comprised of: the rotating-side ring plate 11 having a substantially annular shape and having a substantially circular through-hole at a center portion in a planar view; and the inner-circumferential cylindrical portion 12 formed from the inner periphery edge of the rotating-side ring plate 11 toward the lower side. In addition, two rotating-side connector housing sections 13 protruding toward the +Z direction (upward) are provided on a main surface of the rotating-side ring plate 11 in the +Z direction (upward).

Using the rotator 10 and the stator 20, the inner-circumferential cylindrical portion 12 forms an inner peripheral surface of the housing space S having a cylindrical shape and formed in an interior of the rotary connector device 1.

The rotating-side connector housing section 13 houses a rotating-side connector coupled to a second end side of the FFC 100 housed in the housing space S. A connector of an electric wire cable (not illustrated) connected to an electric circuit of an electric device item such as a horn switch or an airbag unit disposed in the steering wheel is connected to the rotating-side connector housing section 13 from the outside.

As illustrated in FIGS. 1 to 3, the sleeve 30 assembled to the rotator 10 configured as described above is a substantially cylindrical body having a through-hole penetrating in the ±Z direction and disposed at the center portion in a planar view and is assembled in a manner such that the stator 20, which will be described later, is interposed between the rotator 10 and the sleeve 30 from the ±Z direction. This configuration enables the rotator 10 and the stator 20 to relatively rotate in a clockwise direction R and a counterclockwise direction L with the central axis of the rotating-side ring plate 11 being set as a rotation axis A.

As illustrated in FIG. 2, the stator 20 that can rotate relatively to the rotator 10 is a substantially cylindrical body having a bottom and also having an upper surface being opened, the stator 20 being formed by engaging, in the ±Z direction, the stator main body 20A and the sub-stator 20B, the stator main body 20A being a plate body having an opening at the center portion thereof and having a substantially annular shape, the sub-stator 20B being a substantially cylindrical body. The stator 20 includes: a stationary-side ring plate 21 that constitutes a bottom surface; and an outer-circumferential cylindrical portion 22 having a substantially cylindrical shape, an inner peripheral surface of which forms an outer peripheral surface of the housing space S.

Below, the stator main body 20A having the stationary-side ring plate 21 will be described with reference to FIGS. 6A and 6B.

As illustrated in FIG. 6A, the stator main body 20A is a plate-shaped body having a substantially circular shape as viewed from the bottom surface, in which a portion in the +Y direction and a portion in the −X direction, of the outer periphery edge of the stationary-side ring plate 21 formed into a circular shape, are each formed into a straight line, so as to form a corner portion 21a at an end portion in the +Y direction and the −X direction, as viewed from the bottom surface.

At the corner portion 21a formed in the +Y direction and the −X direction of the stator main body 20A as described above, a small connector housing section 23 that can house a small connector used for heating the steering wheel is provided so as to stand in the −Z direction. In addition, an insertion portion 24 is obtained by recessing, toward the −Y direction, a portion formed into a straight shape, insertion portion 24 being provided at an end portion (a portion formed into a straight shape) of the stator main body 20A in the +Y direction and on the +X direction side from the small connector housing section 23.

In other words, the insertion portion 24 is disposed on the outer side, in the radial direction, of the stationary-side ring plate 21 formed into a circular shape in a planar view, with the rotation axis A being the center.

Furthermore, a partition portion 25 protruding toward the −Z direction (downward) is provided in the −Y direction of the insertion portion 24. An engaging concave portion 26 having a rectangular shape is provided further in the −Y direction of the partition portion 25. Note that at the periphery of the partition portion 25 and the engaging concave portion 26, four fixing base portions 27 that each stand toward the −Z direction are provided so as to substantially form four corners of a rectangular shape.

That is, in the rotary connector device 1 in which the rotator 10 and the stator 20 are assembled together, the stator main body 20A includes: the small connector housing section 23, the insertion portion 24, the partition portion 25, the engaging concave portion 26, and the fixing base portion 27, each of which is provided in the −Z direction that is the opposite side from the rotating-side ring plate 11 relative to the stationary-side ring plate 21.

The insertion portion 24 is a recessed portion formed by recessing, toward the −Y direction, an outer periphery edge part of the stationary-side ring plate 21 in the +Y direction that is formed into a straight shape, the amount of the recession being approximately double the thickness of the FFC 100.

The partition portion 25 is a wall that stands so as to separate the insertion portion 24 and the engaging concave portion 26. As illustrated in FIG. 6B, the partition portion 25 is formed into a substantially triangle shape in a cross-section. The side surface of the partition portion 25 at the −Y direction side perpendicularly stands, and the bottom surface side (side of the −Z direction) of the side surface thereof at the +Y direction side is sloped and thinned toward the −Y direction. Note that the tip portion (bottom surface portion) of the partition portion 25 is formed into a round shape.

As illustrated in FIGS. 6A and 6B, the engaging concave portion 26 corresponds to a placement part used to place the stationary-side connector 40 in the rotary connector device 1. When the stationary-side ring plate 21 having an annular shape is viewed from the bottom surface, the engaging concave portion 26 is formed at the inner side in the radial direction than the outer periphery edge of the stationary-side ring plate 21. This engaging concave portion 26 is an engaging hole formed of a projection that protrudes in a substantially square C-shape toward the −Z direction from the main surface of the stationary-side ring plate 21 on the outer side thereof, the +Y direction of this engaging concave portion 26 being opened. In other words, the engaging concave portion 26 is formed of a recess having a substantially rectangular shape as viewed from the bottom surface.

Note that the engaging concave portion 26 is formed such that it does not penetrate through the stationary-side ring plate 21 or no projection is formed on the main surface of the stationary-side ring plate 21 in the +Z direction. The recess of the engaging concave portion 26 formed as described above is formed so as to have a size that allows the bottom surface of the busbar maintaining portion 41 to be engaged with the recess.

The fixing base portions 27 are projections that each protrude from the stationary-side ring plate 21 in the −Z direction so as to substantially have a height approximately double of that of the engaging concave portion 26. The center portion of each of the fixing base portions 27 includes a recessed portion 27a having a circular shape and used for screwing so as to be able to fix it using a screw.

Next, with reference to FIGS. 7A and 7B, description will be made of the sub-stator 20B including the outer-circumferential cylindrical portion 22 forming the outer peripheral surface of the housing space S having the inner peripheral surface formed into a cylindrical shape.

As viewed from the bottom surface, the sub-stator 20B is a cylindrical body having a substantially cylindrical shape and having a size slightly smaller than the stator main body 20A. The sub-stator 20B includes an angled outer peripheral surface 22a provided at an end portion of the outer-circumferential cylindrical portion 22 in the +Y direction and the −X direction, so as to correspond to the corner portion 21a of the stator main body 20A.

Furthermore, as illustrated in FIG. 7A, a temporarily fixing portion 28 formed into a substantially T-shape as viewed from the bottom surface is provided on the outer peripheral surface in the +Y direction and is formed flat, so as to correspond to the end portion of the stator main body 20A in the +Y direction. This temporarily fixing portion 28 is a recessed portion having a substantially T-shape as viewed from the bottom surface and substantially formed into the same shape as the temporary latch portion 423 formed in the upper busbar cover 42 as viewed from the bottom surface.

A protection wall portion 29 having a height that is approximately three-quarter of the partition portion 25 is formed in the −X direction of the temporarily fixing portion 28 so as to be along the outer peripheral surface of the angled outer peripheral surface 22a.

In addition, a cable path T is formed at the inner side, in the radial direction, of the angled outer peripheral surface 22a in the sub-stator 20B. The cable path T has a width that is approximately double the thickness of the FFC 100 along the outer periphery of the angled outer peripheral surface 22a. Note that the cable path T includes: a guide tube Ta that provides guide toward the angled outer peripheral surface 22a along the tangential direction of the outer-circumferential cylindrical portion 22; a direction changing path Tb that provides guide from the guide tube Ta in the +X direction; and an exit path Tc formed from the tip of the direction changing path Tb along the ±X direction (see FIG. 7A).

As illustrated in FIGS. 8A and 8B, in the stator 20 in which the stator main body 20A and the sub-stator 20B configured as described above are engaged with each other, the insertion portion 24 is disposed at the outer side of the housing space S in the radial direction. In addition, the insertion portion 24 is disposed at a position that corresponds to the exit path Tc. This makes it possible to bring the FFC 100 disposed in the cable path T into a state of exiting from the housing space S in the −Z direction along the rotation axis A.

Note that all the insertion portion 24 is disposed at the outer side of the housing space S in the radial direction. However, a portion of the insertion portion 24 may be disposed at the outer side in the radial direction.

In addition, in the stator 20, the protection wall portion 29 that forms the outer peripheral surface of the angled outer peripheral surface 22a is disposed so as to cover the corner portion 21a of the stationary-side ring plate 21, so as to protect the outer peripheral surface of the small connector housing section 23.

Next, with reference to FIGS. 9 to 15, description will be made of a method of assembling the rotary connector device 1 in which the rotary connector device 1 is assembled with the rotor 10 and the stator 20 (the stator main body 20A and the sub-stator 20B) configured as described above.

As illustrated in FIG. 9, it is possible to assemble the rotary connector device 1 with the rotor 10 and the stator 20 being engaged with each other in a relatively rotatable manner by performing in this order: an FFC winding step in which the FFC 100 is wound in the rotator 10 (step s1); a sub-stator assembling step in which the sub-stator 20B is assembled to the rotator 10 in which the FFC 100 is wound (step s2); a stationary-side connector temporarily fixing step in which the stationary-side connector 40 is temporarily fixed to the sub-stator 20B (step s3); a stator-main-body assembling step in which the stator main body 20A is assembled to the sub-stator 20B (step s4); a stationary-side connector assembling step in which the stationary-side connector 40 is assembled to the partition portion 25 (step s5); and a sleeve assembling step in which the sleeve 30 is assembled to the rotator 10 (step s6).

Specifically, the stationary-side connector 40 is attached to the first end side of the FFC 100; the rotating-side connector attached to the second end side of the FFC 100 is housed in the rotating-side connector housing section 13 of the rotator 10; and the FFC 100 is wound so as to be wound around the outer peripheral surface of the inner-circumferential cylindrical portion 12 (step s1).

Next, the sub-stator 20B is assembled to the rotator 10 that is in a state of being inverted upside down so that the inner-circumferential cylindrical portion 12 in which the FFC 100 is wound is disposed at the inner side of the outer-circumferential cylindrical portion 22 (step s2).

In this state, as illustrated in FIG. 10, the first end side of the FFC 100 is inserted into the cable path T in a manner such that the first end side of the FFC 100 wound is looped back so as to be directed toward the −Z direction, and the looped-back location is disposed in the exit path TC. This makes it possible to place the stationary-side connector 40 coupled to the first end of the FFC 100 at the −Z direction.

Next, the stationary-side connector 40 is inverted upside down so that the temporary latch portion 423 formed into a substantially T-shape in a planar view protrudes toward the −Y direction, and the temporary latch portion 423 is caused to engage with the temporarily fixing portion 28. This makes it possible to temporarily fix the stationary-side connector 40 to the sub-stator 20B (step s3).

By assembling the sub-stator 20B to the rotator 10 and temporarily fixing the stationary-side connector 40 to the sub-stator 20B as described above, it is possible to prevent the stationary-side connector 40 from moving accidentally when the stator main body 20A is assembled to the rotator 10 to which the sub-stator 20B is assembled. Thus, it is possible to efficiently perform the operation of assembling the rotary connector device 1.

Next, as illustrated in FIG. 11, the stator main body 20A is assembled to the sub-stator 20B in which the stationary-side connector 40 is temporarily fixed to the temporarily fixing portion 28 as described above, in a manner such that the FFC 100 is inserted into the insertion portion 24 (step s4).

By assembling the stator main body 20A to the sub-stator 20B as described above, the insertion portion 24 is disposed in the −Z direction (downward) of the exit path Tc. This makes it possible to insert, into the insertion portion 24, the tip side of the FFC 100 passing from the housing space S through the guide tube Ta and the direction changing path Tb and disposed in the exit path Tc (see FIG. 12). Thus, it is possible to cause the FFC 100 to exit in the −Z direction while the stator main body 20A is assembled to the sub-stator 20B.

When the stator main body 20A is assembled as described above, the temporary latch portion 423 is engaged with the temporarily fixing portion 28 as illustrated in FIG. 11, and hence, the stationary-side connector 40 is temporarily fixed.

Thus, the FFC 100 having the first end attached to the stationary-side connector 40 is curved toward the outer side in the radial direction.

Furthermore, the side surface of the partition portion 25 in the +Y direction is configured to be thinned toward the −Y direction, which makes it possible to prevent the stationary-side connector 40 from moving in the assembling operation in which the stator main body 20A is assembled to the sub-stator 20B, and also possible to prevent the FFC 100 coupled to the temporarily fixed stationary-side connector 40 from interfering with the stator main body 20A. Thus, it is possible to reliably prevent the FFC 100, from being damaged due to interference with the stator main body 20A being assembled.

Note that, in a state where the stator main body 20A is assembled to the sub-stator 20B that has been assembled to the rotator 10, the FFC 100 having the first end attached to the stationary-side connector 40 is designed such that the length of a portion thereof that exits from the insertion portion 24 is approximately double the height of the partition portion 25.

Following step s4, the temporary latch portion 423 that has been engaged with the temporarily fixing portion 28 is detached to cancel the temporary fixing of the stationary-side connector 40. Then, as illustrated in FIG. 13, the stationary-side connector 40 is inverted upside down, and the lower end side (side where the conductor connection section 412 is disposed) of the stationary-side connector 40 is engaged with the engaging concave portion 26. This makes it possible to attach the stationary-side connector 40 on the main surface of the outer-circumferential cylindrical portion 22 at the lower side (side of the −Z direction) (step s5).

Here, the partition portion 25 having a predetermined height is provided between the insertion portion 24 and the engaging concave portion 26. Thus, by attaching the stationary-side connector 40 on the main surface of the outer-circumferential cylindrical portion 22, the FFC 100 having the first end coupled to the stationary-side connector 40 is looped back with the partition portion 25, which makes it possible to easily engage the stationary-side connector 40 with the engaging concave portion 26, and also possible to prevent the FFC 100 from bending with its own weight.

Note that it is preferable that the height of the partition portion 25 is not less than one-third of and not more than half the length of the FFC 100 that exits from the insertion portion 24.

When it is assumed that the height of the partition portion 25 is less than one-third of the length of the FFC 100 that exits from the insertion portion 24, the FFC 100 may bend and interfere with other members, which possibly results in a damage.

In addition, if the height of the partition portion 25 is more than half of the length of the FFC 100 that exits from the insertion portion 24, the FFC 100 is pulled by the partition portion 25. This may result in the stationary-side connector 40 being not able to be engaged with the engaging concave portion 26 or the stationary-side connector 40 being easily detached from the engaging concave portion 26. Furthermore, if the stationary-side connector 40 is engaged with the engaging concave portion 26, the FFC 100 is pressed against the partition portion 25, which may result in the FFC 100 being damaged.

In contrast, by setting the height of the partition portion 25 to be not less than one-third of and not more than half the length of the FFC 100 that exits from the insertion portion 24, it is possible to reliably engage the stationary-side connector 40 with the engaging concave portion 26, and also possible to prevent the FFC 100 from interfering with other members due to bending.

In a state where the stationary-side connector 40 is engaged with the stationary-side ring plate 21 as described above, the engage groove 52 of the housing cover 50 is caused to slide while being engaged with the upper engaging convex portion 422 and the lower engaging convex portion 432 of the stationary-side connector 40. This makes it possible to assemble the housing cover 50 to the stationary-side connector 40 to a position where the cover fixing portion 53 is brought into contact with the fixing base portion 27 (see FIGS. 14 and 15).

In addition, by screwing together the fixing base portion 27 and the cover fixing portion 53 that are in contact with each other, it is possible to fix the housing cover 50 to the outer-circumferential cylindrical portion 22. Furthermore, it is possible to protect the stationary-side connector 40 housed in the protection space K of the housing cover 50, and also possible to reliably fix the housing cover 50 to the outer-circumferential cylindrical portion 22.

Finally, the sleeve 30 is assemble to the rotator 10 in a manner such that the rotator 10 rotates relatively to the stator 20 and that the stator 20 is interposed between the rotator 10 and the sleeve 30. This makes it possible to complete the rotary connector device 1 (step s6).

In this manner, the rotary connector device 1 includes: the rotator 10 and the stator 20 that engage with each other in a relatively rotatable manner and form, in an interior thereof, the housing space S having a cylindrical shape; the FFC 100 housed in the housing space S in a wound manner. The rotator 10 includes: the rotating-side ring plate 11 having an annular shape and the inner-circumferential cylindrical portion 12 having a cylindrical shape and forming the inner peripheral surface of the housing space S. The stator 20 includes: the stationary-side ring plate 21 having an annular shape, and the outer-circumferential cylindrical portion 22 forming the outer peripheral surface of the housing space S. The FFC 100 has the first end coupled to the stationary-side connector 40 that is electrically connected to an electric device item disposed at a side of the stator 20. The stator 20 includes the insertion portion 24 that allows the first end side of the FFC 100 to be inserted from the housing space S toward the outer side of the rotator 10 along the rotation axis direction (±Z direction) of the rotator 10 that relatively rotates. The stationary-side connector 40 is disposed on the main surface of the stationary-side ring plate 21 on the outer side thereof. With this configuration, it is possible to achieve miniaturization.

Specifically, since the stator 20 includes the insertion portion 24, and since the stationary-side connector 40 coupled to the first end of the FFC 100 is disposed on the stationary-side ring plate 21, this configuration enables the stationary-side connector 40 coupled to the first end side of the FFC 100 that exits from the housing space S toward the outer side (toward the −Z direction) along the rotation axis A to be placed so as to protrude toward a direction (−Z direction) in which the stator 20 is disposed with respect to the rotator 10. That is, it is possible to prevent the first end side of the FFC 100 from being pulled to the outer side in the radial direction, and also possible to prevent the stationary-side connector 40 from protruding toward the outer side of the stationary-side ring plate 21 in the radial direction. Thus, it is possible to reduce the size of the rotary connector device 1.

In addition, the engaging concave portion 26 on which the stationary-side connector 40 is detachably provided is provided on the main surface of the housing space of the stationary-side ring plate 21, on the outer side (−Z direction) thereof. This enables the stationary-side connector 40 inserted into the insertion portion 24 to be detachable with respect to the stationary-side ring plate 21, which makes it possible to efficiently perform the operation of assembling the rotary connector device 1.

Specifically, with the engaging concave portion 26 being provided on the stationary-side ring plate 21, it is possible to detach the stationary-side connector 40 from the stationary-side ring plate 21. Thus, for example, when the stationary-side connector 40 is coupled to the FFC 100 that has been inserted through the insertion portion 24, it is possible to move the stationary-side connector 40 to a desired location that allows the stationary-side connector 40 to be easily coupled to the FFC 100, which makes it possible to easily couple the FFC 100 and the stationary-side connector 40. This makes it possible to efficiently perform the operation of assembling the rotary connector device 1.

In addition, since the stationary-side connector 40 can be detached from the stationary-side ring plate 21, it is possible to easily detach the stationary-side connector 40 from the FFC 100, which allows the disassembling operation to be easily performed.

Yet furthermore, the engaging concave portion 26 is formed integrally on the main surface of the stationary-side ring plate 21 in the −Z direction. This enables the FFC 100 to more smoothly slide in the housing space S. This makes it possible to improve the quality of the rotary connector device 1.

Specifically, the engaging concave portion 26 used to place the stationary-side connector 40 on the stationary-side ring plate 21 is formed on the main surface of the stationary-side ring plate 21. This makes it possible to prevent a protrusion that protrudes toward the housing space S or recessed portion or through-hole recessed toward the −Z direction, from being formed at the housing space S side of the stationary-side ring plate 21.

Thus, when the FFC 100 housed in the housing space S is caused to slide in association with the relative rotation of the rotator 10, it is possible to prevent the FFC 100 from getting caught on the stationary-side ring plate 21. This makes it possible to cause the FFC 100 to smoothly slide.

In addition, the FFC 100 housed in the housing space S can be prevented from interfering with the main surface of the stationary-side ring plate 21 at the housing space S side, which makes it possible to prevent the FFC 100 from being damaged.

Furthermore, the stator 20 includes: the sub-stator 20B including the outer-circumferential cylindrical portion 22; and the stator main body 20A including the stationary-side ring plate 21. In addition, the sub-stator 20B includes the temporarily fixing portion 28 used to temporarily fix the stationary-side connector 40 at the outer side of the outer-circumferential cylindrical portion 22 in the radial direction. This makes it possible to prevent the FFC 100 from being damaged in assembling the rotary connector device 1. Furthermore, it is possible to achieve efficient operation of assembling the rotary connector device 1.

Specifically, since the stator 20 includes the sub-stator 20B and the stator main body 20A, the operation of assembling the rotary connector device 1 can be performed in a manner such that the sub-stator 20B is assembled to the rotator 10 in which the FFC 100 is wound around the inner-circumferential cylindrical portion 12; then, the stationary-side connector 40 is caused to exit to the outer side of the housing space S; and the FFC 100 coupled to the stationary-side connector 40 is caused to be inserted from the housing space S through the insertion portion 24 so as to be directed toward the −Z direction. After this, the stator main body 20A can be assembled to the sub-stator 20B. Thus, it is possible to prevent the FFC 100 that has been inserted through the insertion portion 24 from interfering with the stator main body 20A, which makes it possible to prevent the FFC 100 from being damaged.

In addition, when this stator main body 20A is assembled to the sub-stator 20B, it is possible to temporarily fix the stationary-side connector 40 coupled to the first end of the FFC 100 to the temporarily fixing portion 28. Thus, the stationary-side connector 40 and the first end side of the FFC 100 do not block the assembling operation at the time of assembling the stator main body 20A. This makes it possible to efficiently perform the operation of assembling the rotary connector device 1.

Yet furthermore, the stationary-side connector 40 is temporarily fixed to the temporarily fixing portion 28. Thus, in the operation of assembling the stator main body 20A, it is possible to more reliably prevent the first end side of the FFC 100 from being damaged due to twisting or interfering with other members.

In this manner, the stator 20 includes the sub-stator 20B and the stator main body 20A. In addition, the sub-stator 20B includes the temporarily fixing portion 28. This makes it possible to prevent the FFC 100 from being damaged, and also possible to efficiently perform the operation of assembling the rotary connector device 1.

Furthermore, the insertion portion 24 is provided at the outer side of the housing space S in the radial direction. Thus, the FFC 100 coupled to the stationary-side connector 40 is caused to be inserted through the insertion portion 24 provided at the outer side of the stationary-side ring plate 21 in the radial direction. This results in the FFC 100 housed in the housing space S being disposed at the outer side than the housing space S in the radial direction. Thus, it is possible to prevent the first end side of the FFC 100 caused to be inserted from the insertion portion 24 from being excessively rubbed against the FFC 100 that has been wound at the inner side in the radial direction, which makes it possible to prevent the FFC 100 from being damaged.

Furthermore, the housing cover 50 attached to the stationary-side ring plate 21 is provided so as to surround a portion where the stationary-side connector 40 and the FFC 100 are coupled, that is, the upper engaging convex portion 422. This makes it possible to protect the first end side of the FFC 100 and the stationary-side connector 40, and also possible to prevent an unintentional external force from acting on the first end side of the FFC 100 and the stationary-side connector 40. Thus, it is possible to prevent the stationary-side connector 40 and the first end side of the FFC 100 from being damaged. In addition, by fixing the housing cover 50 to the stationary-side ring plate 21, it is possible to reliably fix the stationary-side connector 40 to the stationary-side ring plate 21.

In addition, the stationary-side connector 40 engaged with the engaging concave portion 26 is disposed at the inner side in the radial direction than the outer periphery edge of the stationary-side ring plate 21. This enables the stationary-side connector 40 to be reliably placed on the inner side of the rotary connector device 1 in the radial direction as viewed from the bottom surface, which makes it possible to pull the first end side of the FFC 100 toward the inner side in the radial direction. Thus, it is possible to prevent the FFC 100 from interfering with other members disposed at the outer side of the rotary connector device 1 in the radial direction, which makes it possible to prevent the FFC 100 from being damaged and also possible to reliably reduce the size of the rotary connector device 1.

The configurations of the disclosure correspond to the embodiment described above in the following manner. The rotation body corresponds to the rotator 10. The fixed body corresponds to the stator 20. The placement part corresponds to the engaging concave portion 26. The first fixed body corresponds to the sub-stator 20B. The second fixed body corresponds to the stator main body 20A. The stationary-side cover corresponds to the housing cover 50. The first-fixed-body assembling step corresponds to the sub-stator assembling step. The stationary-side-connector temporarily fixing step corresponds to the stationary-side-connector temporarily fixing step. The second-fixed-body assembling step corresponds to the stator-main-body assembling step. The stationary-side-connector placing step corresponds to the stationary-side connector assembling step. However, the disclosure is not limited to the configurations of the embodiment described above, and may take various types of embodiments.

For example, the present embodiment employs the configuration in which the stationary-side connector 40 can be engaged with the engaging concave portion 26 provided on the stationary-side ring plate 21 and can be placed there. However, the present embodiment does not need to employ a configuration that is engaged with the stationary-side connector 40, as with the engaging concave portion 26. For example, it may be possible to employ a configuration in which the bottom surface side of the stationary-side connector 40 is slid and latched or a configuration in which a claw is used to latch or a configuration in which other members are used for placement.

In addition, it may be possible to employ a configuration in which the engaging concave portion 26 is comprised of a through-hole that penetrates through the stationary-side ring plate 21 and in which the stationary-side connector 40 is engaged with the through-hole. However, it is preferable to employ a configuration in which the through-hole does not penetrate through the stationary-side ring plate 21.

In addition, it may be possible to employ a configuration in which the stationary-side connector 40 is fixed to the stationary-side ring plate 21, for example, using a thermosetting resin or adhesive to place it.

In this case, the rotary connector device 1 according to the present embodiment includes: the rotator 10 including the rotating-side ring plate 11 having an annular shape and the inner-circumferential cylindrical portion 12 having a cylindrical shape and formed at the inner periphery edge of the rotating-side ring plate 11; and the sleeve 30 assembled to the rotator 10 as a single unit. However, only the rotator 10 that can rotate relatively to the stator 20 may be included.

Yet furthermore, the stator 20 is configured by engaging, with each other, the sub-stator 20B that constitutes the outer-circumferential cylindrical portion 22 and the stator main body 20A that constitutes the stationary-side ring plate 21. However, the stator 20 is not limited to this case, and the outer-circumferential cylindrical portion 22 and the stationary-side ring plate 21 may be configured as a single unit.

In addition, in the present embodiment, the insertion portion 24 is formed in a manner such that the outer periphery edge part of the stationary-side ring plate 21 is recessed. However, the insertion portion 24 may be formed, for example, by recessing the inner periphery edge part. In addition, the insertion portion 24 may be provided so as to penetrate through the main surface of the stationary-side ring plate 21. Furthermore, a portion of the outer-circumferential cylindrical portion 22 that is formed at the outer periphery edge of the stationary-side ring plate 21 may be formed so as to slightly protrude toward the outer side in the radial direction. In addition, a gap may be formed between the outer-circumferential cylindrical portion 22 and the stationary-side ring plate 21 as a single unit.

Figure 16:
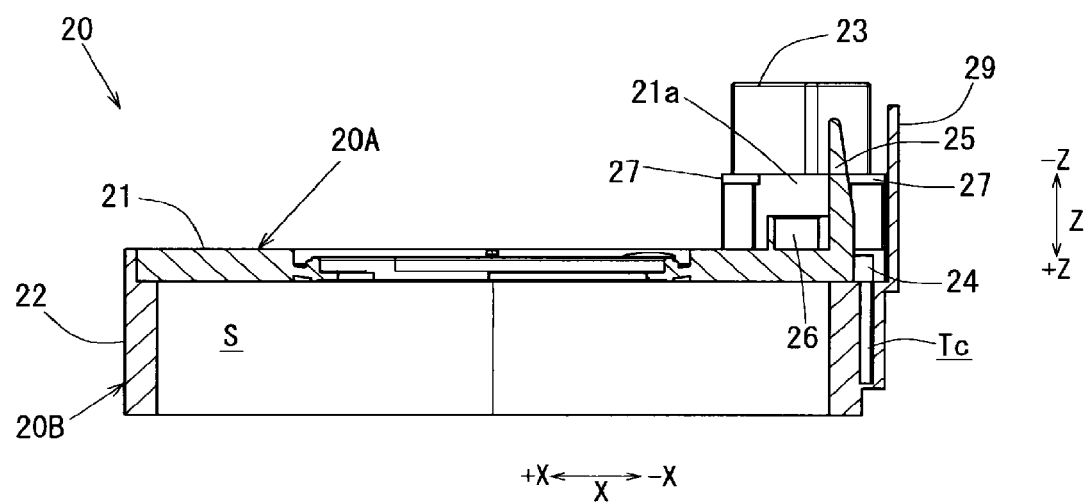
FIG. 16 is a cross-sectional view of a stator according to another embodiment.

Yet furthermore, in the present embodiment, the height of the protection wall portion 29 is configured to be lower than the height of the partition portion 25 (see FIGS. 8A and 8B). However, as illustrated in FIG. 16, the height of the protection wall portion 29 may be configured to be higher than the height of the partition portion 25.

With this configuration, when the stationary-side connector 40 is temporarily fixed to the temporarily fixing portion 28, the FFC 100 that is inserted into the insertion portion 24 is pressed down with the protection wall portion 29. This makes it possible to suppress detachment of the temporary latch portion 423 from the temporarily fixing portion 28, which makes it possible to more efficiently perform the operation of assembling the rotary connector device 1.

In addition, in the present embodiment, the stationary-side connector 40 is configured such that the upper busbar cover 42 and the lower busbar cover 43 are disposed along the ±Z direction. However, for example, the upper busbar cover 42 and the lower busbar cover 43 may be disposed along the ±Y direction.

However, in a case where the upper busbar cover 42 and the lower busbar cover 43 are disposed along the ±Y direction, the upper busbar cover 42 and the lower busbar cover 43 are disposed on the stationary-side ring plate 21 that does not have a large space, which may result in a portion of the upper busbar cover 42 and the lower busbar cover 43 protruding toward the outer side in the radial direction.

Thus, it is preferable to dispose the upper busbar cover 42 and the lower busbar cover 43 along the ±Z direction. Note that, with the upper busbar cover 42 and the lower busbar cover 43 being disposed along the ±Z direction, there is a possibility that the mechanical strength of the stationary-side connector 40 is weakened. Thus, it is preferable to reinforce the stationary-side connector 40 using the housing cover 50.

In the stationary-side-connector temporarily fixing step (step s3) of the method of assembling the rotary connector device 1 according to the present embodiment, temporary fixing is performed to the temporarily fixing portion 28 provided on the outer-circumferential cylindrical portion 22 that the sub-stator 20B includes. However, for example, it may be possible to perform temporary fixing to a temporarily fixing portion separately provided in an assembling apparatus (not illustrated) for assembling the rotary connector device 1. In other words, it is not necessary to provide a temporarily fixing portion used to temporarily fix the stationary-side connector 40 only at a specific location of the rotary connector device 1. The temporarily fixing portion may be externally provided outside the rotary connector device 1.

Note that the characteristic configurations described in the embodiments described above may be combined on an as-necessary basis without departing from the main point of the disclosure such as achieving miniaturization of the rotary connector device 1.

REFERENCE SIGNS LIST

1 Rotary connector
10 Rotator
11 Rotating-side ring plate

12 Inner-circumferential cylindrical portion
20 Stator
20A Stator main body
20B Sub-stator
21 Stationary-side ring plate
22 Outer-circumferential cylindrical portion
24 Insertion portion
26 Engaging concave portion
28 Temporarily fixing portion
40 Stationary-side connector
50 Housing cover
100 Flat cable
S Housing space
s2 Sub-stator assembling step
s3 Rotating-side connector temporarily fixing step
s4 Stator-main-body assembling step
s5 Stationary-side connector assembling step

The invention claimed is:

1. A rotary connector device comprising:
   a rotation body and a fixed body that engage with each other in a relatively rotatable manner and form, in an interior thereof, a housing space having a cylindrical shape; and
   a flat cable housed in the housing space in a wound manner, wherein
   the rotation body comprises: a rotating-side ring plate having an annular shape and an inner-circumferential cylindrical portion having a cylindrical shape and forming an inner peripheral surface of the housing space,
   the fixed body comprises: a stationary-side ring plate having an annular shape and an outer-circumferential cylindrical portion forming an outer peripheral surface of the housing space,
   the flat cable has a first end coupled to a stationary-side connector that is electrically connected to an electric device item disposed at a side of the fixed body,
   the fixed body comprises an insertion portion that allows a first end side of the flat cable to be inserted from the housing space toward an outer side of the fixed body along a rotation axis direction of the rotation body that relatively rotates,
   the stationary-side connector is disposed on a main surface of the stationary-side ring plate on an outer side thereof,
   the main surface of the stationary-side ring plate on the outer side thereof comprises a placement part used to place the stationary-side connector,
   a wall-shaped partition portion is arranged to separate the insertion portion and the placement part,
   the flat cable extends from the housing space through the insertion portion and is looped back over the partition portion to the stationary-side connector placed at the placement part, and
   the stationary-side connector is disposed at an inner side in a radial direction than an outer periphery edge of the stationary-side ring plate.

2. The rotary connector device according to claim 1, wherein
   the placement part is formed integrally on the main surface of the stationary-side ring plate on the outer side thereof.

3. The rotary connector device according to claim 1, wherein
   the fixed body comprises: a first fixed body comprising the outer-circumferential cylindrical portion and a second fixed body comprising the stationary-side ring plate, and
   the first fixed body comprises a temporarily fixing portion configured to temporarily fix the stationary-side connector at an outer side of the outer-circumferential cylindrical portion in a radial direction.

4. The rotary connector device according to claim 1, wherein
   all or a portion of the insertion portion is provided at an outer side than the housing space in a radial direction.

5. The rotary connector device according to claim 1, wherein
   a stationary-side cover to be attached to the stationary-side ring plate is provided so as to surround a portion where the stationary-side connector and the flat cable are coupled.

6. A method of assembling a rotary connector device in which a rotation body and a fixed body are relatively rotatably engaged with each other and are assembled thus forming, in an interior thereof, a housing space having a cylindrical shape and housing, in a wound manner, a flat cable having a first end coupled to a stationary-side connector electrically connected to an electric device item disposed in a vehicle body, wherein
   the rotation body comprises: a rotating-side ring plate having an annular shape and an inner-circumferential cylindrical portion having a cylindrical shape and forming an inner peripheral surface of the housing space,
   the fixed body comprises: a stationary-side ring plate having an annular shape and an outer-circumferential cylindrical portion forming an outer peripheral surface of the housing space,
   the fixed body comprises:
   a first fixed body comprising the outer-circumferential cylindrical portion and
   a second fixed body comprising the stationary-side ring plate provided with:
   an insertion portion that allows a first end side of the flat cable to be inserted from the housing space toward an outer side of the fixed body along a rotation axis direction of the rotation body that relatively rotates;
   a placement part used to place the stationary-side connector on a main surface of the stationary-side ring plate on an outer side thereof; and
   a wall-shaped partition portion arranged to separate the insertion portion and the placement part,
   wherein in the assembled rotary connector device, the flat cable extends from the housing space through the insertion portion and is looped back over the partition portion to the stationary-side connector placed at the placement part, and
   the method comprises the steps of:
   assembling the first fixed body of the outer-circumferential cylindrical portion to the rotation body around which the flat cable is wound;
   temporarily fixing the stationary-side connector;
   assembling the second fixed body to the first fixed body in a manner such that the first end side of the flat cable is inserted into the insertion portion from the housing space toward the outer side along the rotation axis direction; and
   assembling, in a stationary-side connector assembling step, the stationary-side connector-to the partition portion,
   these steps being performed in this order.

7. The method of assembling a rotary connector device according to claim 6, wherein
   the first fixed body comprises a temporarily fixing portion provided at an outer side of the outer-circumferential cylindrical portion in a radial direction and used to temporarily fix the stationary-side connector coupled to the first end of the flat cable, and the temporarily fixing comprises temporarily fixing the stationary-side connector to the temporarily fixing portion.

8. The method of assembling a rotary connector device according to claim 6, wherein after the placing the stationary-side-connector, a stationary-side cover that surrounds a portion where the stationary-side connector and the flat cable are coupled is attached to the stationary-side ring plate.

\* \* \* \* \*